(12) United States Patent
Manon et al.

(10) Patent No.: US 6,398,137 B1
(45) Date of Patent: *Jun. 4, 2002

(54) MOUNT AND FEEDER ARRANGEMENT FOR A PRECISION PLACEMENT SPREADER

(75) Inventors: Kenneth P. Manon, Lindenwood; Roland L. Hagemeyer; Melvin L. Wilton, both of Rochelle, all of IL (US)

(73) Assignee: The Louis Berkman Company, Steubenville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/692,670

(22) Filed: Oct. 19, 2000

Related U.S. Application Data

(63) Continuation of application No. 09/469,108, filed on Dec. 21, 1999, now Pat. No. 6,220,532.

(51) Int. Cl.$^7$ .............................................. A01C 19/00
(52) U.S. Cl. ........................ 239/672; 239/675; 239/681; 239/687
(58) Field of Search ................................ 239/672, 675, 239/681, 687, 688, 650, 671; 414/462; 222/612, 626, 160; 224/401, 400, 410, 494, 495, 548, 502, 924, 917.5

(56) References Cited

U.S. PATENT DOCUMENTS

| | | |
|---|---|---|
| 842,238 A | 1/1907 | Park |
| 1,746,410 A | 2/1930 | Tolman, Jr. |
| 2,865,416 A | 12/1958 | Hetteen |
| 3,013,803 A | 12/1961 | Piester |
| 3,097,711 A | 7/1963 | Clark |
| 3,113,784 A | 12/1963 | Swenson et al. |
| 3,329,322 A | 7/1967 | Herd |
| 3,332,691 A | 7/1967 | Swenson et al. |
| 3,588,155 A | 6/1971 | Hirt |
| 3,776,431 A | 12/1973 | Riley |
| 4,167,248 A | 9/1979 | Akazawa et al. |
| 4,212,428 A | 7/1980 | Walker |
| 4,266,731 A | 5/1981 | Musso, Jr. |
| 4,283,014 A | 8/1981 | Devorak |
| 4,367,848 A | 1/1983 | Ehmke et al. |
| 4,477,762 A | 10/1984 | Kurakake et al. |
| 5,186,396 A | 2/1993 | Wise et al. |
| 5,842,649 A | 12/1998 | Beck et al. |
| 5,947,391 A | 9/1999 | Beck et al. |

FOREIGN PATENT DOCUMENTS

| | | |
|---|---|---|
| CA | 1164971 | 4/1984 |
| DE | 344563 | 5/1920 |
| NL | 297920 | 11/1965 |
| SE | 169976 | 1/1960 |
| SU | 1184453 | 3/1988 |

*Primary Examiner*—Lisa Ann Douglas
(74) *Attorney, Agent, or Firm*—Vickers, Daniels & Young

(57) ABSTRACT

A truck having a material spreader and a control mechanism to regulate the velocity of materials ejected from the material spreader. The material spreader includes a material guider to guide the trajectory of substantially all the materials in a direction substantially opposite the direction of forward movement of the truck. The control mechanism includes a velocity sensor adapted to detect the velocity of the truck and to send a signal indicative of the truck velocity to a velocity controller. The velocity controller sends a signal to the material spreader which is dependent on the truck velocity to control the velocity of the materials ejected from the material spreader. The material spreader is mounted to the truck to allow the material spreader to be moved between a non-operational and operational position. The material spreader is also mounted to allow for lateral and/or upward movement upon encountering a predetermined force.

60 Claims, 16 Drawing Sheets

MOUNT AND FEEDER ARRANGEMENT FOR A PRECISION PLACEMENT SPREADER

This patent application is a continuation, in-part of application Ser. No. 09/469,108 filed on Dec. 21,1999, now U.S. Pat. No. 6,220,532 and incorporated herein by reference.

The present invention relates to the art of trucks having an apparatus for spreading materials and, more particularly, to an improved truck having a spreader system which improves the control of dispensing the contents of a dump truck, and even more particularly to a mounting for a spreader and a guide arrangement for directing particulate materials to the spreader.

INCORPORATION BY REFERENCE

U.S. Pat. Nos. 5,842,649 and 5,947,391 illustrate a spreader apparatus for spreading materials, hydraulic control circuits for a conveyor and a spreader, and a precision placement spreader and is incorporated herein by reference. U.S. Pat. No. 3,113,784 illustrates a hydraulic control system for a conveyor and spreader and is incorporated herein.

BACKGROUND OF THE INVENTION

Trucks, such as dump trucks, have commonly been used to convey materials such as salt, cinders, chemicals and/or sand for the purposes of spreading these materials onto road surfaces to improve the traction of the road surface during hazardous conditions. The materials in the truck are commonly dispensed by tilting the dump body of the truck thereby releasing the goods from the dump body and/or conveying the materials within the dump body out through an opening in the rear of the dump body. The materials which are conveyed out through the rear of the dump body can be spread by use of a spinner which creates a wide spray pattern behind the rear of the truck as the truck moves in the forward direction.

In some applications, it is sometimes desirable to be able to spread the particulate material in a relatively narrow strip in the road. In such circumstances, a broadcast spinner design cannot perform such a function since the spinner sprays the material over a wide area on the ground surface. In order to prevent the broadcast spraying of the particulate material, a material guide must be positioned closely adjacent to the rotating spinner so as to narrow the spread of particulate materials being deposited onto the ground surface. One such spreader design is disclosed in Assignee's U.S. Pat. Nos. 5,842,649 and 5,947,391. The spreader can spread particulate material in a broadcast spreader mode or in a narrow band. The spreader can be controlled to ensure that a substantially set amount of particulate material is dispensed over a ground surface irrespective of the speed of the truck. The spreader also can dispense particulate material in a substantially narrow band on the ground surface irrespective of the vehicle velocity.

The design of the spreader guide of the spreader also reduces caking problems associated with past spreader guide designs.

Although the spreader disclosed in the '649 patent and '391 patent is a significant advancement, such spreaders cannot easily be adapted for use on a wide variety of trucks. Consequently, specialty trucks are necessary to mount and properly use the spreader. In view of this problem, there is a demand for a mounting arrangement for spreaders that can be mounted and used on a variety of trucks. There is also a demand for a mounting arrangement which can easily align the spreader on the vehicle so that proper dispensement of particulate material on the ground surface is achieved. There is a further demand for a mounting arrangement which can easily move the spreader between an operational position and a storage position to enhance the versatility of use of the spreader and the truck. There is still a further demand for a mounting arrangement for a spreader which minimizes damage to the spreader when the spreader is in the operational position.

SUMMARY OF THE INVENTION

The present invention relates to an improvement in trucks having an apparatus for spreading particulate material on a ground surface as the truck travels along a ground surface.

In accordance with a preferred embodiment of the present invention, there is provided a truck which includes a material spreader that is mounted on the frame of the truck by a spreader mount. The spreader mount simplifies the installation of the material spreader on the truck. In one embodiment, the spreader mount adjusts the position of the material spreader with respect to the truck frame. In one aspect of this embodiment, the spreader mount positions the material spreader in a plurality of locations relative to the truck frame. In another embodiment, the spreader mount allows movement of the spreader when the spreader contacts an undesired object so as to minimize damage to the material spreader by the object.

In accordance with an aspect of the present invention, there is provided a truck having a hopper or dump body for holding materials. The hopper or dump body includes an opening for materials to be dispensed from the hopper or dump body. In one embodiment, the hopper includes an opening in the hopper to control the amount of materials exiting the opening. In another embodiment, the hopper or dump body includes two side walls which are angularly positioned with respect to the base so as to provide sloped surfaces which slope downward to the base of the hopper or dump body. In yet another embodiment, the opening in the hopper or dump body is positioned at the rear wall of the hopper or dump body and closely adjacent to the base of the hopper or dump body. In one specific aspect of this embodiment, the opening is smaller than the rear wall of the hopper. In still yet another embodiment, a conveyor system is positioned at least partially in the base of the hopper of dump body. The conveyor system moves particulate material such as sand, salt, gravel, cinders, chemicals and/or the like in the hopper or dump body toward the opening in the hopper or dump body. In one aspect of the embodiment, the conveyor system extends longitudinally from the forward end of the hopper or dump body to the rear end of the hopper or dump body and is evenly spaced between the two side walls of the hopper or dump body. In another aspect of the embodiment, the opening in the hopper or dump body is in longitudinal alignment with the conveyor system. In a further embodiment, the hopper or dump body includes a feedgate. In one aspect of this embodiment, the feedgate is vertically adjustable. In another aspect of the embodiment, the feedgate is mounted closely adjacent to the opening. In still another aspect of the embodiment, the feedgate slidably moves up and down to control the size of the passageway through the opening in the hopper or dump body; rotates in and/or about the opening, and/or shifts horizontally toward and/or away from the opening. In still a further embodiment, a material spreader arrangement is positioned on the truck to receive particulate material exiting the opening of the hopper or dump body and to spread such particulate material onto the ground surface. The material spreader may be positioned directly below the hopper or dump body opening or positioned off to the side of the hopper or dump body opening. The material spreader position depends on the particular spreading pattern and spreading application for the spreader. In one aspect of this embodiment, the material spreader arrangement includes a material guide which, when engaged, guides the trajectory of substantially all the materials expelled from the material spreader. In another aspect of the embodiment, the material guide guides the trajectory of the material in a direction substantially opposite of the forward direction of the truck. In another embodiment, a control mechanism is included on the truck to regulate the speed of the conveyor system thereby controlling the amount of material being expelled through the opening in the hopper or dump body. In one aspect of this embodiment, the control mechanism is integrated with the material spreader to regulate the velocity of materials which are ejected from the material spreader. In another aspect of the embodiment, the control mechanism is designed to obtain a velocity reading of the truck and to use such information to control the conveyor system and/or material spreader so as to maintain a constant quantity of materials deposited on a ground surface irrespective of the speed of the vehicle of the truck and/or to deposit the particulate material on a ground surface at a zero velocity relative to the ground surface.

In accordance with another aspect of the present invention, the conveyor system is mounted below the base plane of the hopper or dump body. Such positioning of the conveyor system facilitates in the conveyance of substantially all the particulate material in the hopper or dump body to the opening in the hopper or dump body. In one embodiment, the conveyor system includes a material mover such as a continuous belt, a chain link, an auger or other designs which can effectively move particulate materials from one area in the hopper or dump body to the opening in the hopper or dump body. In another embodiment, the conveyor system includes a conveyor motor to drive the material mover and cause the particulate materials to be expelled through the opening in the hopper or dump body. In one aspect of this embodiment, the motor is a hydraulic motor, an electric motor and/or a gas power motor. In still another embodiment, a gear box arrangement is used to drive the material mover.

In accordance with yet another aspect of the present invention, a material spreader arrangement includes a rotating member designed to propel particulate materials, which are received in the material spreader arrangement, out of the rear of the material spreader arrangement. In one embodiment, the rotating member is a spinner which rotates about an axis which axis is substantially perpendicular to the ground surface. However, a wide variety of rotating members having various axis of rotation may be used on the material spreader. In another embodiment, the rotating member includes at least one vane extending from the surface of the rotating member which is adapted to engage and throw material outwardly as the spinner rotates. In one aspect of this embodiment, the spinner includes multiple upwardly extending vanes so as to efficiently propel a large volume of particulate material from the material spreader. In still another embodiment, the material spreader arrangement includes a motor designed to rotate the rotating member. In one aspect of this embodiment, the motor is a hydraulic motor, an electric motor and/or a gas power motor. In yet another embodiment, the material spreader arrangement includes a retaining wall to retain substantially all the particulate material on the rotating member until the particulate material is propelled through the opening in the material spreader arrangement. In one aspect of this embodiment, when the rotating member is a spinner, the retaining wall extends at least 180° about the spinner and is positioned such that the particulate materials are substantially retained on the spinner and propelled by the vanes on the spinner for a sufficient time to be properly propelled from the spinner at a desired velocity. In still another embodiment, the height of the retaining wall is greater than the height of the vanes on the spinner. In still yet another embodiment, the rotation direction of the rotating member is the same for both broadcast mode spreading and precision placement spreading. In a further embodiment, the rotation direction of the rotating member is different for broadcast mode spreading and precision placement mode spreading. In one aspect of this embodiment, the rotating member rotates in a counter-clockwise direction during broadcast mode spreading and counterclockwise for precision placement mode spreading. For certain applications, the reversal of rotation direction of the rotating member improves the desired spreading profile of the particulate material on the ground surface. In still another embodiment, the material spreader arrangement includes a skid plate. In one aspect of this embodiment, the skid plate includes an angular upwardly extending section to facilitate in the skidding of the skid plate on the ground surface and/or to facilitate in the movement of the material guider over an object.

In accordance with another aspect of the present invention, the material spreader arrangement includes a material guider designed to direct particulate material expelled from the rotating member. In one embodiment, the material guider directs particulate material in a direction which is substantially opposite the direction of the forward movement of the truck. In another embodiment, the material guider extends rearwardly from the material spreader arrangement. In still another embodiment, the material guider includes a substantially planar wall which is positioned closely adjacent to the rotating member. In one aspect of this embodiment, the planar wall of the material guider is co-planar to the retaining wall of the material spreader arrangement. In another aspect of this embodiment, the planar wall extends rearwardly from the rotating member in a plane substantially parallel to the plane of the ending of the retaining wall. In yet another embodiment, the material guider includes an angular wall member which forms a varying width passageway. In one aspect of this embodiment, the wide end of the passageway of the material guider is positioned near the rotating member of the material spreader and the width of the passageway decreases at least at one point from the width of wide end passageway. In another aspect of this embodiment, the width of the passageway continues to decrease as the distance from the wide end passageway increases. In yet another aspect of this embodiment, the narrowing of the passageway terminates into a constant width section of the material guider which width is substantially constant until the materials are completely expelled from the material guider. The varying width passageway is designed to collect materials expelled from the rotating member and to narrow the stream of materials so that the majority of materials which are eventually expelled from the material guider are deposited in a substantially narrow strip on the ground surface. In another aspect of this embodiment, the design of the varying width passageway of the material guider is selected so as to not substantially reduce the velocity of the materials being expelled from the rotating member as the stream of particulate materials are narrowed by the material guider. In still yet another embodiment, the passageway of the material guider is a constant width passageway form the rotating member to the particle expelling point. Other passageway designs can also be incorporated in the material guider. In a further embodiment, the material guider includes a top plate to inhibit particulate material from escaping the material guider and randomly spreading onto the ground surface. The top plate also inhibits rain or other liquids from entering the material guider passageway which could cause caking and/or corrosion in the passageway. In another embodiment, the material guider includes a base plate which at least partially retains the materials in the material guider as the materials pass through the material guider and to further seal the passageway from moisture which could result in caking and/or corrosion. In another embodiment, the material guider arrangement provides for self cleaning of the passageway. Any caking which begins in the passageway is removed by the particulate material scraping off the caking as the particulate material moves rearwardly through the passageway. In still another embodiment, the material guider design reduces or eliminates powderization problems at high particle velocities by not causing the particulate material to substantially alter its trajectory upon leaving the rotating member. In still another embodiment, the material guider includes an end skid plate. In one aspect of the embodiment, the skid plate includes an angular upwardly extending end section to facilitate in the skidding of the skid plate on the ground surface and/or to facilitate in the movement of the material guider over an object.

In accordance with another aspect of the present invention, the material spreader arrangement includes a mechanism for engaging and disengaging the material guider. In such an arrangement, the material guider or a portion thereof is mounted so that it can be raised or lowered into engagement with the particulate material being expelled from the rotating member. In one embodiment, the material guider is pivotally mounted to the rear portion of the material spreader arrangement. In another embodiment, the movement of the material guider is accomplished by a hydraulic lifter, motor or by some other mechanical means. If a hydraulic lifter or motor is used, the control mechanism can be connected to or interconnected to a hydraulic system or electrical system so that the engagement and disengagement of the material guider or a portion thereof can be controlled from a remote location.

In accordance with a further aspect of the present invention, a spreader mount secures the material spreader arrangement to a vehicle, such as a truck. In one embodiment, the spreader mount secures the material spreader arrangement to the frame of a vehicle. In one aspect of this embodiment, the spreader is secured to a location on the vehicle that is rearward of the vehicle bumper so that the mount location does not protrude forwardly of the vehicle bumper. In another embodiment, the spreader mount is secured to the hopper or dump body of the truck.

In accordance with still a further aspect of the present invention, the spreader mount adjustably positions the material spreader arrangement on a vehicle. In one embodiment, the spreader mount positions the material spreader arrangement in a plurality of locations with respect to the vehicle frame, hopper and/or dump body. In one aspect of this embodiment, the spreader mount positions the material spreader arrangement in an operational position and in a storage position. In the operational position, the material spreader arrangement is positioned to receive particulate material that has passed through an opening in the hopper or dump body of the vehicle and to spread such particulate material onto a ground surface. In the storage position, the material spreader arrangement is positioned so as to not receive particulate material for spreading on a ground surface. In another aspect of this embodiment, the operational position of the material spreader arrangement positions the material spreader arrangement rearwardly of the vehicle frame and aligns the material spreader arrangement so that the material spreader arrangement dispenses particulate material in a desired location on the ground surface. In yet another aspect of this embodiment, the storage position of the material spreader arrangement positions the material spreader arrangement closely adjacent to the vehicle frame. In still yet another aspect of this embodiment, the storage position of the material spreader arrangement positions the material spreader at least partially under the hopper or dump body of the vehicle, and preferably substantially completely under the hopper or dump body of the vehicle. In another embodiment, the spreader mount includes a positioning bracket that at least partially rotates about a mount shaft.

In one aspect of this embodiment, the mount shaft of the spreader mount is rigidly attached to the vehicle frame. In another aspect of this embodiment, the mount shaft has a generally circular cross-sectional shape at least at the location where the positioning bracket rotates at least partially about the mount shaft. In still another aspect of this embodiment, the positioning bracket is releasably secured to the mount shaft to allow for positioning the positioning bracket at a plurality of locations about the mount shaft. In still yet another aspect of this embodiment, the positioning bracket is positionably at a plurality of locations along the vertical axis of the mount shaft so that the height of the positioning bracket from a ground surface can be adjusted. In a further aspect of this embodiment, the mount shaft extends substantially vertically toward the ground surface. In still a further aspect of this embodiment, the positioning bracket releasably clamps to said mount shaft. In still yet another embodiment, a bracket locator is used to define a desired position of the positioning bracket on the mount shaft. In one aspect of this embodiment, the bracket locator defines the positioning bracket location for the operational position of the material spreader arrangement. In another aspect of this embodiment, the bracket locator defines the positioning bracket location for the storage position of the material spreader arrangement. In yet another aspect of this embodiment, at least a portion of the bracket locator can be positioned in a plurality of locations about the mount shaft. In still another aspect of this embodiment, the bracket locator includes at least one positioning notch to receive a portion of the positioning bracket when the positioning bracket is positioned in a desired location relative to the bracket locator. In still yet another aspect of this embodiment, a portion of the positioning bracket is releasably secured in the notch on the positioning bracket. In a further aspect of this embodiment, the bracket locator is positionable at a plurality of locations along the vertical axis of the mount shaft so that the height of the bracket locator from a ground surface can be adjusted. In still a further aspect of this embodiment, the bracket locator is vertically positioned on the support post by at least one releasable pin.

In accordance with still yet a further aspect of the of the present invention, the spreader mount includes a support leg which is secured to the material spreader arrangement. In one embodiment, the material spreader arrangement is pivotally mounted to the support leg. In one aspect of this embodiment, an elastic material, such as, but not limited to, a spring, is connected or interconnected between the material spreader arrangement and the support leg to allow for limited pivoting of the material spreader arrangement on the support leg. The elastic material at least partially functions as a shock absorbing device to reduce stresses on the spreader mount during the operation of the material spreader arrangement. In another aspect of this embodiment, the tension of the elastic material is adjustable. In still another aspect, the material spreader arrangement is mounted on the support leg to pivot upward and downward with respect to a ground surface. In another embodiment, the material spreader arrangement is connected or interconnected to one end of the support leg and the other end of the support leg is connected or interconnected to a positioning bracket.

In accordance with another aspect of the present invention, the support leg includes at least one stress release point. The stress release point on the support leg is designed to allow one or more sections of the support leg to move when at least one of the support legs encounters a force. Such a force can be caused by, but is not limited to, the material spreader arrangement bumping into the road, or other objects during operation. The force encountered by the material spreader arrangement translates to the support leg. When the encountered force is great enough, the force causes at least one section of the support leg to move at a stress release point. In one aspect of this embodiment, one stress release point is positioned between two sections of the support leg and allows at least one of the support leg sections to move generally upwardly and/or downwardly with respect to the longitudinal axis of the support leg upon encountering a generally upward or downward force. In another aspect of this embodiment, one stress release point is positioned between two sections of the support leg and allows at least one of the support leg sections to move generally laterally with respect to the longitudinal axis of the support leg upon encountering a generally lateral force. In still another aspect of this embodiment, at least one of the stress release points allow at least one of the support leg sections to move upon encountering a predetermined force. In still yet another aspect of this embodiment, the predetermined force to cause at least one of the support leg sections to move is adjustable. In a further aspect of this embodiment, the support leg includes at least one elastic member, such as, but not limited to, a spring, to maintain at least two leg sections of the support leg in alignment until a predetermined force is applied to at least one of the leg sections. In this aspect of the invention, the predetermined force is selected by selecting the amount of elasticity of the elastic member, i.e. picking the size of the spring, and/or adjusting the tension on the elastic member. In still a further aspect of this embodiment, at least one of the stress release points on the support leg is resettable to its original position. In another aspect of this embodiment, the support leg includes at least three leg sections to allow for both lateral movement and vertical and/or downward movement of at least one leg section. In yet another aspect of this embodiment, at least two leg sections of the support leg can move in a plurality of positions relative to one another.

In accordance with yet another aspect of the present invention, a guide arrangement is used to move particulate material exiting the hopper or dump body to the material spreader arrangement. In one embodiment, the guide arrangement moves particulate material horizontally along the rear of the vehicle. In one aspect of this embodiment, the guide arrangement moves particulate material to at least one side end of the vehicle. In another aspect of this embodiment, the guide arrangement moves particulate material to a location where a material spreader arrangement can spread particulate material in the center of a two lane road while the vehicle remains in a single lane. In still another aspect of this embodiment, the guide arrangement moves particulate material to a location where a material spreader arrangement can spread particulate material in the center of a lane while the vehicle remains in a single lane. In another embodiment, the guide arrangement is detachable secured rearwardly of the hopper or dump body. In one aspect of this embodiment, the guide arrangement is detachably secured to the rear of the hopper or dump body. In another aspect of this embodiment, the guide arrangement includes one or more removeable pins to enable the guide arrangement to be detached from the vehicle. In yet another embodiment, the guide arrangement includes a trough-like section to receive particulate materials from the hopper or dump body. In still another embodiment, the guide arrangement includes a conveying system to move particulate material in the guide arrangement. In one aspect of this embodiment, the conveying system includes a conveying belt, an auger, chain links, or the like. In one preferred embodiment, the conveying system includes an auger to move the particulate material within the guide arrangement. In another aspect of this embodiment, the conveying system includes a motor to control the speed of the particulate materials being moved within the guide arrangement. The motor can be hydraulic, gear, belt, electric and/or gas powered. In still another aspect of this embodiment, the motor controls the speed particulate materials are moved in the guide arrangement as a function of the speed of the vehicle and/or the volume of the particulate material is to be spread on a ground surface. In still yet another embodiment, the guide arrangement is designed for use with a hopper of a pivoting or non-pivoting dump body. In one aspect of this embodiment, the guide arrangement includes a back plate to contact at least a portion of the tailgate of a dump body when the dump body pivots rearwardly to dump particulate material in the guide arrangement. The back plate facilitates in controlling the size of the opening caused by the tailgate, prevents the tailgate from fully opening to allow particulate materials to flow over the edges of the guide arrangement, and/or functions with the tailgate to guide particulate materials into the guide arrangement. In a further embodiment, the guide arrangement includes a base opening to allow particulate materials to exit the guide arrangement. In one aspect of this embodiment, the base opening can be opened and closed. In another aspect of this embodiment, the base opening is sized to minimize the occurrences of clogging as the particulate materials exit the guide arrangement. In still another aspect the this embodiment, the conveying system of the guide arrangement at least partially extends over the exit opening to ensure particulate materials are transported to the exit opening and/or to facilitate in breaking up of particulate materials about the exit opening to minimize the occurrences of clogging in the exit opening. In yet another aspect of this embodiment, the exit opening is positioned at one end of the guide arrangement. In still yet another aspect of this embodiment, the exit opening is positioned generally above the material spreader arrangement when the material spreader arrangement is positioned in the operational position. In still a further embodiment, particulate material in the guide arrangement is at least partially wetted with a wetting solution prior to entering the material spreader arrangement. In one aspect of this embodiment, the wetting solution includes a deicing solution. In another aspect of this embodiment, the particulate material is sprayed with a wetting solution. In still another aspect of this embodiment, the volume of wetting solution applied to the particulate material is a function of the volume of wetting solution to be applied to a ground surface and/or a function of the amount of particulate material being conveyed by the guide arrangement. In still yet a further embodiment, the guide arrangement at least partially breaks up the particulate material prior to directing the particulate material to the material spreader arrangement.

In accordance with still another aspect of the present invention, the material spreader arrangement includes a particulate funnel to receive particulate materials exiting the guide arrangement and/or an opening in the hopper or dump body. In one aspect of this embodiment, the particulate fennel includes at least one sloped surface to guide received particulate material into the material spreader arrangement. In accordance with this aspect, the particulate funnel includes a slope section which progressively narrows the passageway of the particulate funnel so as to deposit the particulate material in a particular area in the material spreader arrangement. In another aspect of this embodiment, the particulate fennel guides particulate materials to a certain region on the rotating member of the material spreader arrangement so that the rotating member engages such materials and expels such materials from the material spreader arrangement. In another embodiment, the top of the particulate funnel is spaced from the exit opening of the guide arrangement. In still yet another embodiment, the top of the particulate fennel is connected to or interconnected to the exit opening of the material guide arrangement. In still another embodiment, the particulate fennel includes adjusting shoots to alter the location at which the particulate material is deposited in the material spreader arrangement. One type of adjusting shoot arrangement is disclosed in U.S. Patent No. 3,332,691, which is incorporated herein by reference. The ability to control the position of the particulate material being deposited in the material spreader arrangement allows for the control of various types of spray patterns caused by the rotating member as the particulate material exits the material spreader arrangement.

In accordance with another aspect of the present invention, a control mechanism is provided which includes a velocity monitor to detect the speed of the truck. In one embodiment, the velocity monitor is connected to the speedometer of the truck, to one of the axles of the truck and/or is a radar gun attached to the truck. In another embodiment, the signal received from the velocity monitor is processed by the control mechanism and is used to send a control signal to the conveyor system, guide arrangement and/or material spreader arrangement. In one aspect of this embodiment, the control mechanism uses an arithmetic function and/or state tables to send a control signal to the conveyor system, guide arrangement and/or material spreader arrangement as a function of the signal received from the velocity monitor. In another aspect of this embodiment, the arithmetic function and/or state tables are stored in memory locations of a microprocessor. In still another aspect of this embodiment, the microprocessor is designed to rapidly calculate and/or select one or more values dependent on the velocity of the truck and to send such values to the conveyor system, guide arrangement and/or material spreader arrangement. As can be appreciated, the control mechanism can be set so as to maintain a constant quantity of particulate materials deposited on a ground surface during the operation of the truck. During such operation, the control mechanism is activated for depositing a desired volume of particulate material on the ground surface. During the movement of the truck, the control mechanism monitors the speed of the truck and sends a signal to the conveyor system to increase or decrease the speed of the conveyor motor which causes a desired amount of particulate material to be expelled through the opening in the hopper or dump body. The control mechanism may also send a signal to the guide arrangement to regulate the speed the particulate materials are moved within the guide arrangement and/or send a signal to the material spreader arrangement to regulate the speed of the rotating member so as to assure that the material spreader arrangement properly deposits the quantity of particulate material being fed to the material spreader to the ground surface. In yet another embodiment, a sensor is attached to the material mover and/or conveyor motor to monitor the speed of the material mover and to send a feedback signal to the control mechanism to further adjust the speed of the material mover. If a feedgate door is attached to the hopper or dump body opening, the control mechanism may be connected or interconnected to the feedgate door to monitor and/or control the size of the hopper or dump body opening by controlling and/or monitoring the position of the feedgate door. In still another embodiment, if the feedgate door is controllably movable, the feedgate door is connected or interconnected to a motor and/or hydraulic system to move the feedgate door.

In still another aspect of the present invention, the control mechanism controls the material spreader arrangement so as to deposit particulate material on a ground surface which is substantially zero with respect to the ground surface. In such an operation, the control mechanism is set to deposit materials at zero velocity. If the material guider is automatically engageable and disengageable, the control mechanism engages the material guide, otherwise the material guider is manually engaged. In one embodiment, the control mechanism monitors the speed of the vehicle and sends a signal to the material spreader arrangement which is dependent on the speed of the truck. The signal may be the result of an arithmetic function and/or from state tables. The signal to the material spreader arrangement controls the speed of the rotational member. The rotational speed of the rotating member is dependent on the speed of the truck so that the particulate materials which are expelled from the material guider by the rotational member in a direction rearwardly of the forward movement of the truck when traveling at a velocity are deposited at substantially the same as the velocity of the truck in the forward direction. Such a particulate velocity results in a substantially zero velocity of the particulate material relative to the ground surface. When the truck changes velocity, the control mechanism sends a different signal to the material spreader arrangement to adjust the rotational speed of the rotating member so that the velocity of the particulate material is adjusted to closely match the velocity of the truck. In another embodiment, a sensor is attached to the rotating member and/or rotating member motor to monitor the speed of the rotating member and to send a feedback signal to the control mechanism to further adjust the speed of the rotating member.

In still yet another aspect of the present invention, the control mechanism controls the material spreader arrangement so as to enable a constant quantity of particulate material to be deposited on the ground surface. In such an operation, the control mechanism controls the conveyor system, and the material spreader arrangement, and if used, the guide arrangement. In one embodiment, a desired amount of material to be deposited on the ground surface is imputed into the control system by the operator. When the truck is in movement, the control mechanism monitors the speed of the truck and sends a signal to the conveyor arrangement, and if used, the guide arrangement, which is dependent on the quantity of material to be deposited on the ground and the speed of the truck. The signal may be the result of an arithmetic function and/or from state tables. The signal to the conveyor arrangement causes the speed of the material mover to be adjusted so that the desired amount of materials are expelled through the opening in the hopper or dump body. The signal to the conveyor arrangement causes the speed of the material mover to be adjusted so that the desired amount of materials are expelled through the opening in the hopper or dump body. The signal to the guide arrangement causes the materials deposited in the guide arrangement to be moved at a speed toward an opening in the guide arrangement to be directed to the material spreader arrangement. In one aspect of the embodiment, the speed of the material mover is dependent on the speed of the truck. In still another embodiment, the control mechanism sends a signal to the material spreader arrangement to control the rotational speed of the rotating member. In another aspect of this embodiment, the rotational speed of the rotating member is dependent on the speed of the truck. In one aspect of this embodiment, the control signal causes the rotating member to rotate at a velocity to cause particulate material which is expelled from the material guider to have a velocity which is substantially the same as the forward velocity of the truck which translates into a relative zero velocity with respect to the ground surface. In another aspect of this embodiment, when the speed of the vehicle increases or decreases in speed, the control mechanism responds by altering the signal to the conveyor system, guide arrangement, and to the material spreader arrangement so as to adjust for the changes in speed of the truck. If the material guider is pivotally mounted to the material spreader and can be engaged and disengaged from a remote location, the control of the material guider is integrated into the control mechanism so that when an operator selects a narrow strip spread pattern, the control mechanism causes the material guider to be moved into engagement during such an operation. In still another aspect of this embodiment, the direction of rotation of the rotating member in the material spreader can be remotely set for use on the material spreader in a broadcast mode or a precision placement mode. In yet another embodiment, control sensors are included on the conveyor arrangement, guide arrangement and/or material spreader to monitor the actual velocity of the material mover of the conveyor arrangement, the actual velocity of the material guide arrangement and/or the rotational speed of the rotating member and to send such information back to the control mechanism so the control mechanism can process such speeds and make any adjustments to such speeds as necessary. In still yet another embodiment, the dump body or hopper has a feedgate which position can be controlled from a remote location.

The primary object of the present invention is to provide a truck which can dispense particulate material in a controlled manner.

Another object of the present invention is to provide a truck which can dispense particulate material in a substantially narrow strip as the truck moves in a forward direction.

In accordance with still yet another object of the present invention is to provide a truck which can deposit a narrow strip of particulate material on a ground surface at a velocity which is substantially zero with respect to the ground surface.

In accordance with yet another object of the present invention is to provide a truck having a control mechanism designed to monitor the speed of the truck and to control the rate of dispensement of particulate materials from the truck onto a ground surface which is dependent on the speed of the truck.

It is another object of the present invention to provide a material guider designed to control the trajectory of materials being expelled from a truck so as to deposit such materials in a narrow strip over a wide range of velocities of a truck.

In accordance with yet another object of the present invention is to provide a truck incorporating a control mechanism using feedback control to monitor the dispensement of particulate materials from the truck onto a ground surface.

In accordance with a further object of the present invention is to provide a material spreader mount which can secure the material spreader arrangement to a truck frame.

In accordance with yet a further object of the present invention is to provide a material spreader mount which can position the material spreader arrangement in a plurality of locations relative to a truck frame.

In accordance with another object of the present invention is to provide a material spreader mount which allows for accurate positioning of the material spreader arrangement relative to a truck frame.

In accordance with yet another object of the present invention is to provide a material spreader mount which allows for some movement of the material spreader arrangement during operation to minimize damage to the material spreader arrangement.

In accordance with still another object of the present invention is to provide a material spreader mount which allows for vertical and/or lateral movement of the material spreader arrangement during operation.

In accordance with still yet another object of the present invention is to provide a material spreader mount with a tension adjuster to control the amount of movement and/or when any movement of the material spreader arrangement occurs during operation of the material spreader arrangement.

In accordance with a further object of the present invention is to provide a guide arrangement at the rear of a hopper or dump body of a truck to transport particulate material from the rear of the hopper or dump body toward a material spreader.

In accordance with yet a further object of the present invention is to pre-wet particulate materials with a de-icing solution prior to spreading the particulate material on a ground surface.

In accordance with still yet a further object of the present invention is to provide a spreading system which minimizes clogging and caking of components during operation.

In accordance with another object of the present invention is to provide a spreading system which can be easily assembled and disassembled to increase the versatility of a truck.

In accordance with yet another object of the present invention is to provide a spreading system which can be used on a variety of different trucks.

These and other objects and advantages will become apparent to those skilled in the art upon reading the following description taken together with the preferred embodiment disclosed in the accompanied drawings.

BRIEF DESCRIPTION OF THE DRAWINGS

Reference may now be made to the drawings, which illustrate various preferred embodiments that the invention may take in physical form and in certain parts and arrangement of parts wherein.

DETAILED DESCRIPTION OF THE PREFERRED EMBODIMENT

Figure 1:
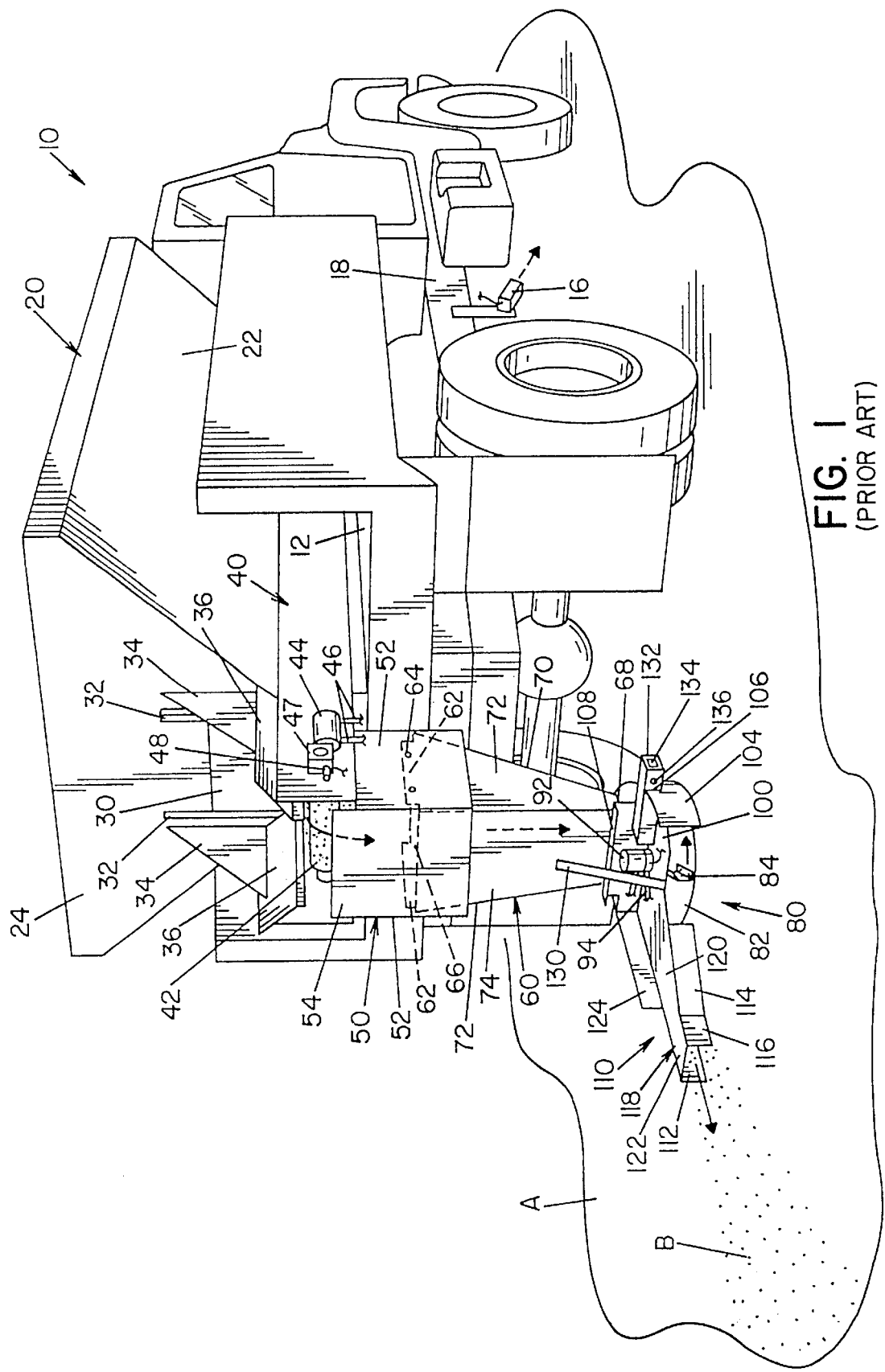
FIG. 1 is a perspective view of a prior art truck which includes a conveyor system and a material spreader arrangement to spread particulate materials behind the center of the truck.

Referring now to the drawings wherein the showings are for the purpose of illustrating preferred embodiments of the invention only and not for the purpose of limiting the same, FIG. 1 illustrates a conventional truck 10 having a hopper 20 mounted at the back end of the truck. The hopper 20 may be of any suitable type and, as illustrated herein, is of the V-box type which is adapted to receive particulate material B such as salt, sand, chemicals and/or cinders. Hopper 20 includes sides 22 sloping toward the base of the hopper. Mounted in the base of the hopper is a conveyor system 40 which is centrally located in the base of the hopper, preferably below the base plane of the hopper. The conveyor system 40 is adapted to transport particulate materials in the hopper toward an opening in the rear wall of the hopper. The conveyor system is in longitudinal alignment with the opening. The conveyor system includes a central longitudinally extending conveyor belt 42 integrated into the base of the hopper 20. The conveyor arrangement includes a front sprocket shaft and a rear sprocket shaft upon which conveyor belt 42 is rotated. Conveyor belt 42 preferably is a fabric belt or a rubber belt. The conveyor belt is shown to have a flat surface; however, the conveyor belt may include ribs to facilitate in the conveyance of particulate material. Alternatively, the conveyor belt may be a series of bar flights. A conveyor motor 44 is connected to the motor gearbox 47 which in turn drives the rear sprocket shaft to move the conveyor belt. A conveyor sensor 48 is connected to motor gearbox 47 to monitor the speed of rotation of conveyor belt 42. Conveyor motor 44 is a hydraulically driven motor and includes two fluid lines 46 for supplying hydraulic fluid to drive the conveyor motor 44. Although not shown, the fluid lines are connected to a pump and a fluid reservoir. A valve may also be attached to the fluid lines 46 to control the flow of fluid to conveyor motor 44. Such a hydraulic arrangement is well known in the art and will not be further discussed. The conveyor is illustrated as an endless type belt conveyor; however, it is contemplated that other types of conveyors could be used for delivering materials through the opening such as a screw type or auger conveyor.

Hopper 20 includes a feedgate 30 to adjust the size of the opening in rear wall 24 of hopper 20. Two gate rails 32 guide the feedgate and enable the feedgate to be moved upwardly and downwardly to control the size of opening. Although not shown, the feedgate is moved by a screw drive, hydraulic lift or pulley arrangement. Such arrangements for moving the feedgate are well known in the art and will not be further described.

As shown in FIG. 1, conveyor arrangement 40 extends through the opening and rearwardly from hopper rear wall 24. Side flanges 34 and guide plate 36 are connected to the back side of hopper rear wall 24 so as to direct particulate material which is flowing through rear wall opening back onto conveyor belt 42 so that substantially all the particulate material flowing through rear wall opening is deposited into top opening 66 of material bin 50. Material bin 50 includes two side walls 52 and a front wall 54. The side walls are mounted in one position to truck bed 12 of truck 10. Material bin 50 is mounted relative to conveyor 40 such that material bin 50 is positioned below the back end of conveyor 40 to receive substantially all the materials moving off conveyor belt 42. Front wall 54 of material bin 50 extends upwardly from side walls 52 so as to capture substantially all of the particulate material being conveyed off of conveyor belt 42.

A funnel receptacle 60 is connected to the inner side walls of material bin 50. Funnel receptacle 60 includes two side panels 72, a front panel 74 and a rear panel 70. Side panels 72 include a mount flange 62 adapted to mount side panels 72 to the interior of side walls 52 of material bin 50. Mount flanges 62 include mount openings 64 adapted to receive a connector for securing mount flange 62 to the side walls of material bin 50. Rear panel 70 is mounted on side panels 72 to slope toward front panel 74 to form a funnel receptacle having a wider top opening 66 than a bottom opening 68. In addition, one of the side panels 72 slopes inwardly toward the other side panel so that bottom opening 68 is narrower than top opening 66. The design of the funnel receptacle 60 is adapted to receive materials deposited into material bin 50 and to direct such materials into a specific location in material spreader 80 which is connected.

Material spreader 80 includes a disk 82 mounted onto a spreader motor 92. Spreader motor 92 is mounted onto spreader top plate 100. Disk 82 includes four disk vanes 84 which are mounted to the disk. The disk is preferably 18–30 inches in diameter and includes four vanes wherein each vane has a height of about 2–6 inches. More vanes can be used, but too many vanes may cause too much bounce as the particulate material is deposited onto ground surface A. The disk is mounted to be driven in a counterclockwise direction by a positive displacement type hydraulic spreader motor 92 to propel the particulate material to the right side of spreader 80. However, other spreader designs can be used which would require the spinner to rotate in a clockwise direction and propel the particulate material to the left side of spreader 80. Spreader motor 92 includes motor fluid lines 94 which supply hydraulic fluid for driving the motor which rotates disk 82. Although not shown, fluid lines 94 are connected to a pump and a fluid reservoir. A valve may also be attached to fluid lines 94 to control the flow of fluid to disk motor 92. Such a hydraulic arrangement is well known in the art and will not be further discussed.

Connected to the top surface of top plate 100 is connector flange 108. Connector flange 108 connects the top plate of spreader 80 to the front panel 74 of funnel receptacle 60. Spreader 80 is further connected to fennel receptacle 60 by support bar 130. Support bar 130 helps to maintain spreader 80 in a substantially constant position relative to funnel receptacle 60. Spreader 80 also includes a side plate 104 which is connected to the edge of top plate 100. Side plate 104 extends above the surface of top plate 100 and extends below the surface of top plate 100 to at least the plane in which the disk rotates. Additionally, side plate 104 extends about the perimeter of disk 82 so as to create a retaining wall around the disk extending from the side of the disk around through the back of the disk to the other side of the disk. Side plate 104 is positioned closely adjacent to the disk so as to retain material deposited on the disk from funnel receptacle 60 until the disk has propelled such materials through the backside of material spreader 80. For a disk having a diameter of about 24 inches, the arcuate portion of the side plate is about 25–26 inches. One function of side plate 104 is to direct the materials flowing through bottom opening 68 of funnel receptacle 60 onto the surface of disk 82.

A lift bar 132 is connected to top plate 100 and the side of connector flange 108 and extends through a side plate slot 106 of side plate 104. Lift bar 132 includes a lift bar opening positioned longitudinally through lift bar 132. Lift bar 132 is adapted to receive a bar connected to a lifter so that material spreader 80 and funnel receptacle 60 can be easily positioned into material bin 50 to connect the material spreader and funnel receptacle to the material bin or alternatively, to disengage the funnel receptacle and material spreader from the material bin. Connector hole 136 is adapted to secure the lift rod which is inserted into lift bar opening 134 when the material spreader and funnel receptacle are being connected and/or engaged from material bin 50.

Connected to the top plate 100 and side plate 104 of material spreader 80 is material guide 110. Material guide 110 is positioned above ground surface A and lies in a plane substantially parallel to the ground surface. The bottom edge of the material guider is positioned at a sufficiently close distance to the ground to minimize the width of the strip or swath of particulate material being deposited on the ground surface by the material guide. Preferably, the material guide is spaced less than 24 inches from the ground surface and more preferably 2 to 14 inches from the ground surface. Material guide 110 includes a planar guide side 112 which is connected to one end of side plate 104 and to the top side edge of top plate 100. Planar guide side 112 is a one-piece planar extension of side plate 104 which extends rearwardly from the truck when material spreader 80 and fennel receptacle 60 are mounted to material bin 50. Planar guide side 112 includes a reinforcement flange 124 extending above the surface of top plate 100. Reinforcement flange 124 is designed to rigidify the position of the material guide 110 with respect to material spreader 80. Reinforcement flange 124 is an upward extension of planar guide side 112. Material guide 110 also includes a top plate 118. Top plate 118 includes a rectangular section 122 and an angular section 120. Top plate 102 is connected to top plate 100 of material spreader 80 and lies in a plane substantially the same as the plane in which top plane 100 lies. Top plate 118 and top plate 100 are a one-piece unit. Rectangular section 122 of top plate 118 is positioned at the end of material guide 110 and is connected to planar guide side 112 and parallel guide side 116. Angular section 120 of top plate 118 is connected to rectangular section 122 and lies in substantially the same plane as rectangular section 122. Angular section 120 is also connected to angular guide side 114 and planar guide side 112. This design of material guide 110 forms a wide passageway opening positioned closely adjacent to disk 82 which passageway narrows until reaching the passageway formed between planar guide side 112 and parallel guide side 116. In one preferable dimensional arrangement of the material guide, guide side 112 is about 24–26 inches, the height and width of the end section of the material guide is about 6–8 inches, and the angular passageway narrows from a width of 10–14 inches to a width of 6–8 inches.

Figure 14:
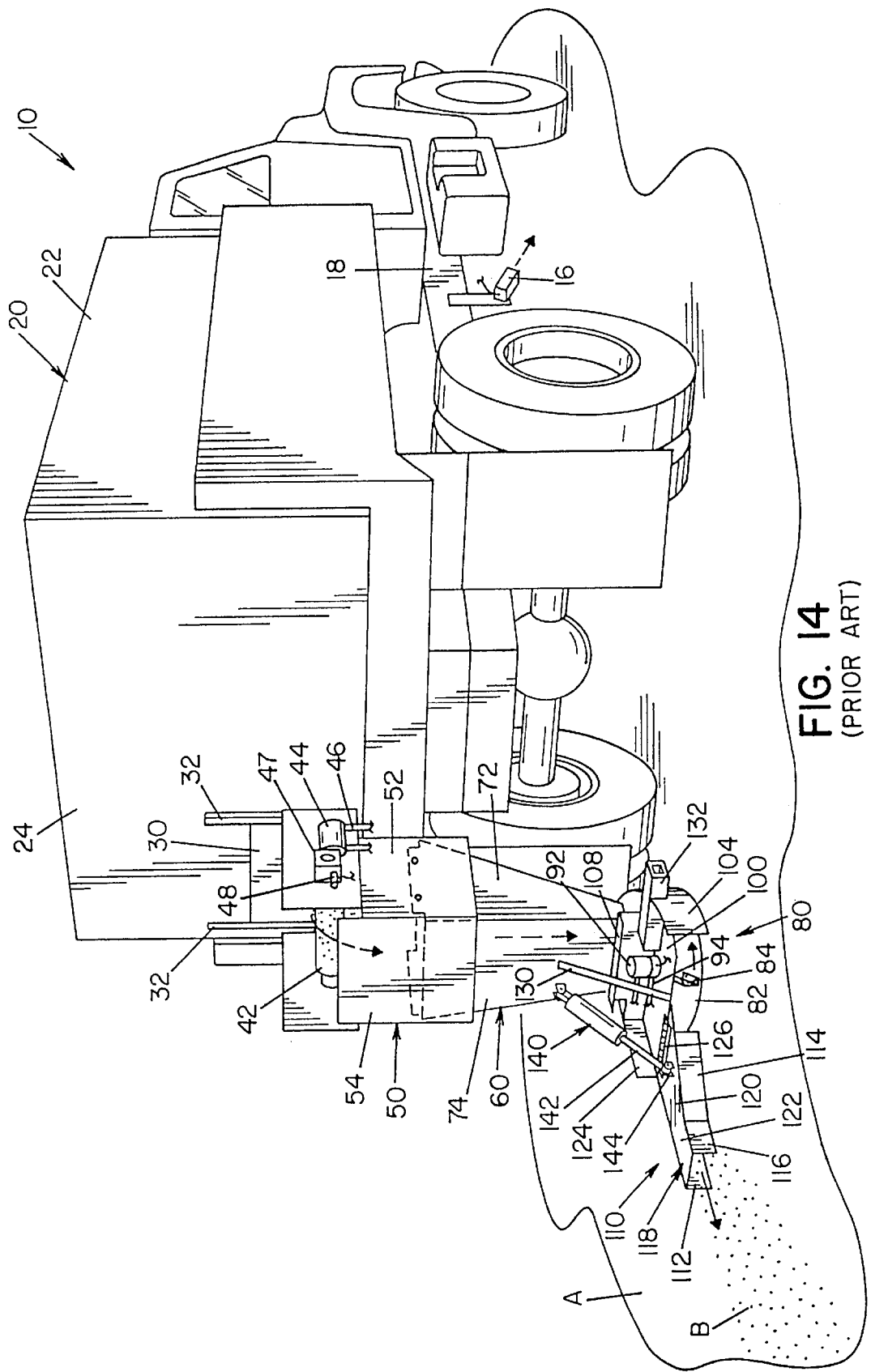
FIG. 14 is a perspective view of a prior art truck which includes a conveyor system and a material spreader arrangement to spread particulate materials behind one side of the truck.

Referring now to FIG. 14, an alternative prior art spreader arrangement is shown. The spreader arrangement spreads particulate material B on ground surface A behind one side of truck 10. This arrangement is different from the arrangement in FIG. 1 where in the spreader arrangement spreads particulate material B on ground surface A behind the center of the truck. In FIG. 14, truck 10 has a hopper 20 mounted at the back end of the truck. The hopper 20 is a rectangular type hopper which is adapted to receive particulate material B. Hopper 20 includes sides 22 which a substantially perpendicular to the base of the hopper. Mounted in the base of the hopper is a conveyor system 40 which is located on the left side of the base of the hopper. The design and operation of conveyor system 40 are substantially the same as conveyor system 40 shown in FIG. 1. Hopper 20 also includes a feedgate 30 to adjust the size of opening in rear wall 24 of hopper 20. The opening in the rear wall is positioned near one side of the rear wall. The design and operation of feedgate 30 and structures about feedgate 30 are substantially the same as feedgate 30 shown in FIG. 1. A material bin 50 is also mounted to the hopper and/or conveyor. The design and operation of material bin 50 are substantially the same as material bin 50 shown in FIG. 1. Connected to the base of material bin 50 is a material spreader 80. The design and operation of material spreader 80 are substantially the same as material spreader 80 shown in FIG. 1. A material guide 110 is also connected to the material spreader. The basic design and operation of material guide 110 are substantially the same as material guide 110 shown in FIG. 1.

One modification to the material guide 110 shown in FIG. 14 as compared to the material guide shown in FIG. 1 is that guide top plate 118 is pivotally mounted to top plate 100 of material spreader 80. Such lifting and lowering of material guide 110 with respect to material spreader 80 can be accomplished by including a hydraulic lifter 140. As can be appreciated, the material guide can be alternatively lifted by a chain, rope or wire. Hydraulic lifter 140 includes a piston 142. Piston 142 is connected to guide top plate 118 by piston hinge 144 and the end of hydraulic lifter 140 is connected to front panel 74 of funnel receptacle 60. Guide top plate is hingeably attached to spreader top plate 100 by hinge 126. When piston 142 is extended, material guide 110 is in the engaged position. When piston 142 is in the retracted position, material guide 110 is in the unengaged position. If material guide 110 is in the unengaged position wherein planar guide side 112 and angular guide side 114 do not engage the particulate material being thrown outwardly from material spreader 80 by disk 82, spreader 80 is converted into a broadcast type spreader which disperses particulate material over a wide area of the ground surface during operation. The lifting and/or lowering of material guide 110 can be by manual, automatic and/or remote controlled. When the material guide is lifted, the rotational speed of the disk can be reduced for broadcast spreading. The reduction of speed can be automatically controlled.

The prior art material spreading arrangements designed and used by The Louis Berkman Company as shown in FIGS. 1 and 14 are modified, improved and expanded upon by the present invention. The present invention improves the manner in which the particulate material is conveyed to the material spreader arrangement after the particulate material has exited the hopper or dump body. The present invention also increases the versatility for using the material spreader. The present invention further improves the mounting of the material spreader onto the vehicle. These improvements are shown in FIGS. 2–13 and 15–16.

Figure 2:
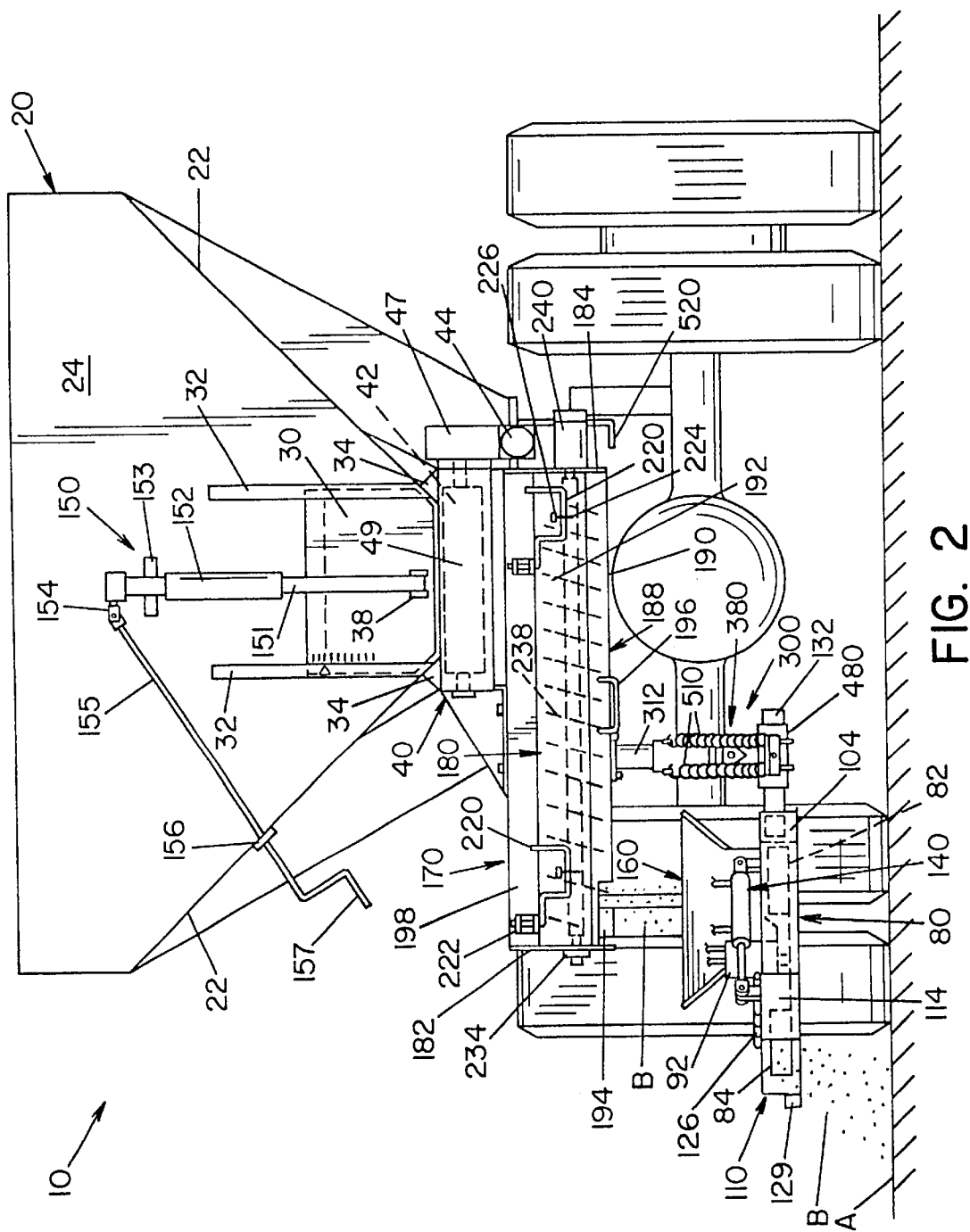
FIG. 2 is a rear view of a truck similar to the one illustrated in FIG. 1 which includes the guide arrangement and material spreader arrangement in accordance with the present invention.
Figure 3:
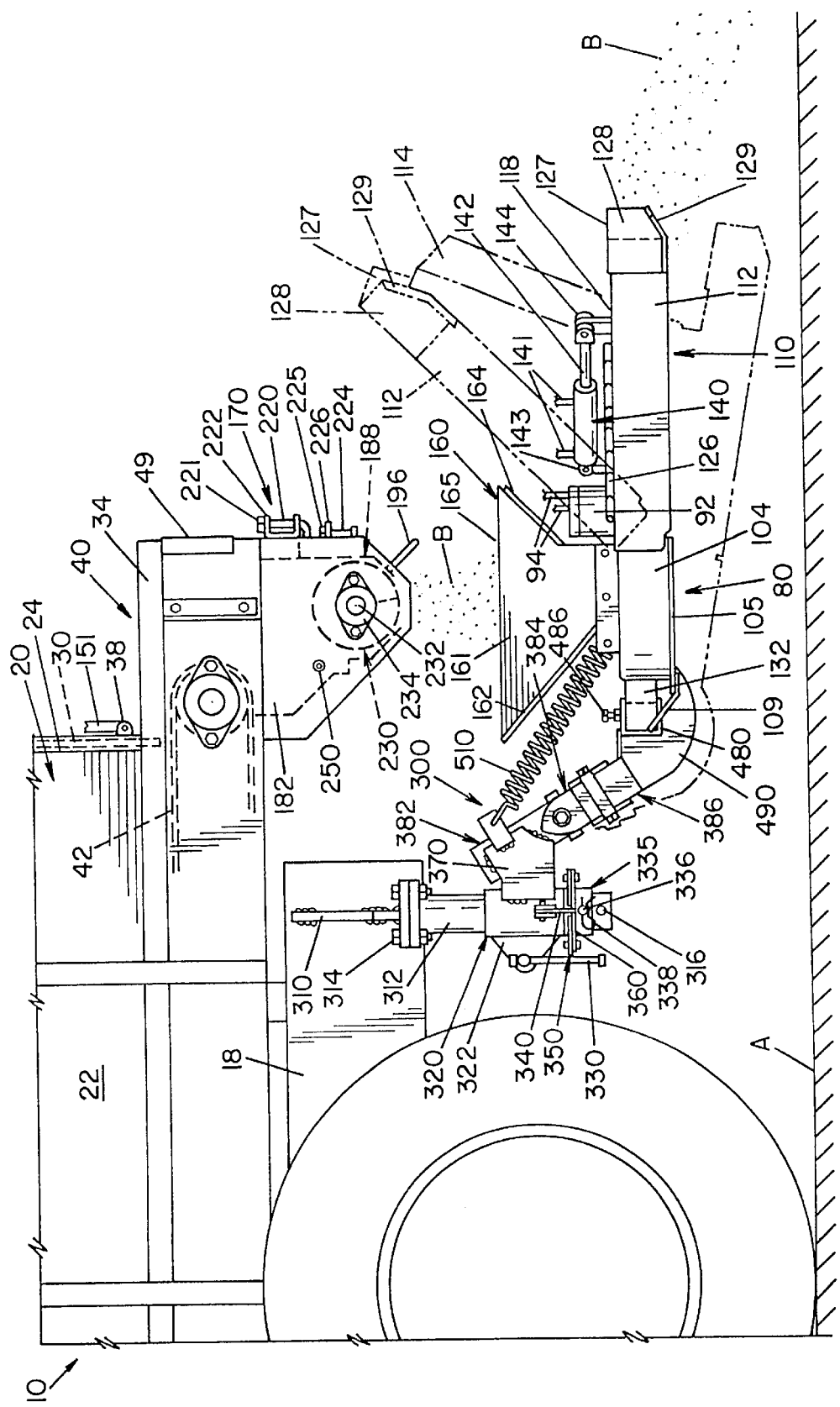
FIG. 3 is an enlarged side view of the guide arrangement and material spreader arrangement as illustrated in FIG. 2.

Referring now to FIGS. 2 and 3, a conventional truck 10 having a hopper 20 mounted at the back end of the truck is shown. Hopper 20 is a V-box type which receives particulate material B such as salt, sand, chemicals and/or cinders. As can be appreciated, the shape of hopper can be rectangular shaped as shown in FIG. 14. Hopper 20 includes sides 22 sloping toward the base of the hopper. Hopper 20 includes a feedgate 30 to adjust the size of an opening in rear wall 24 of hopper 20. Two gate rails 32 guide the feedgate when the feedgate is moved upwardly and downwardly. Feedgate 30 is moved by a feedgate door opener 150. Feedgate door opener includes a cylinder 152 which receives a piston 151. Piston 151 is secured to feedgate 30 by opener hinge 38. Cylinder 152 is connected to rear wall 24 by cylinder mount 153. Piston 151 is moved upward and downward within cylinder 152 by a screw drive driven by screw 154. Screw 154 is rotated by screw bar 155 having a handle 157 and which screw bar is mounted to rear wall 24 by bar mount 156. As can be appreciated, door opening mechanism which use mechanisms other than a screw drive can be used to open and/or close feedgate 30. Furthermore, the door opening mechanism can be connected to a motor so as to 1) eliminate the need for a bar handle, 2) automate the movement of the feedgate, and/or operate the movement of the feedgate from a remote location.

Mounted in the base of hopper 20 is a conveyor system 40 which is centrally located in the base of the hopper. The conveyor system 40 is adapted to transport particulate materials in the hopper toward the opening in the rear wall of the hopper. The conveyor system includes a central longitudinally extending conveyor belt 42 integrated into the base of the hopper 20 and which is in longitudinal alignment with opening in the rear wall 24. The conveyor arrangement includes a front sprocket shaft and a rear sprocket shaft upon which conveyor belt 42 is rotated. Conveyor belt 42 is a fabric belt and/or a rubber belt, and may have a flat and/or rough surface. A conveyor motor 44 is connected to the motor gearbox 47 which in turn drives the rear sprocket shaft to move the conveyor belt. Conveyor motor 44 can be electrically and/or hydraulically driven. In the embodiment illustrated, the conveyor is of the endless type belt conveyor; however, it is contemplated that other types of conveyors could be used for delivering materials through opening such as a screw type conveyor. Conveyor arrangement 40 extends through the opening in rear wall 24. Side flanges 34 are connected to the back side of rear wall 24 to direct particulate material back onto conveyor belt 42 so that substantially all the particulate material flowing through the rear wall opening is deposited into guide arrangement 170. Guide arrangement 170 is used, instead of material bin 50 as shown in FIGS. 1 and 14, to direct particulate material conveyed off of conveyor belt 42 to material spreader 80.

Figure 10:
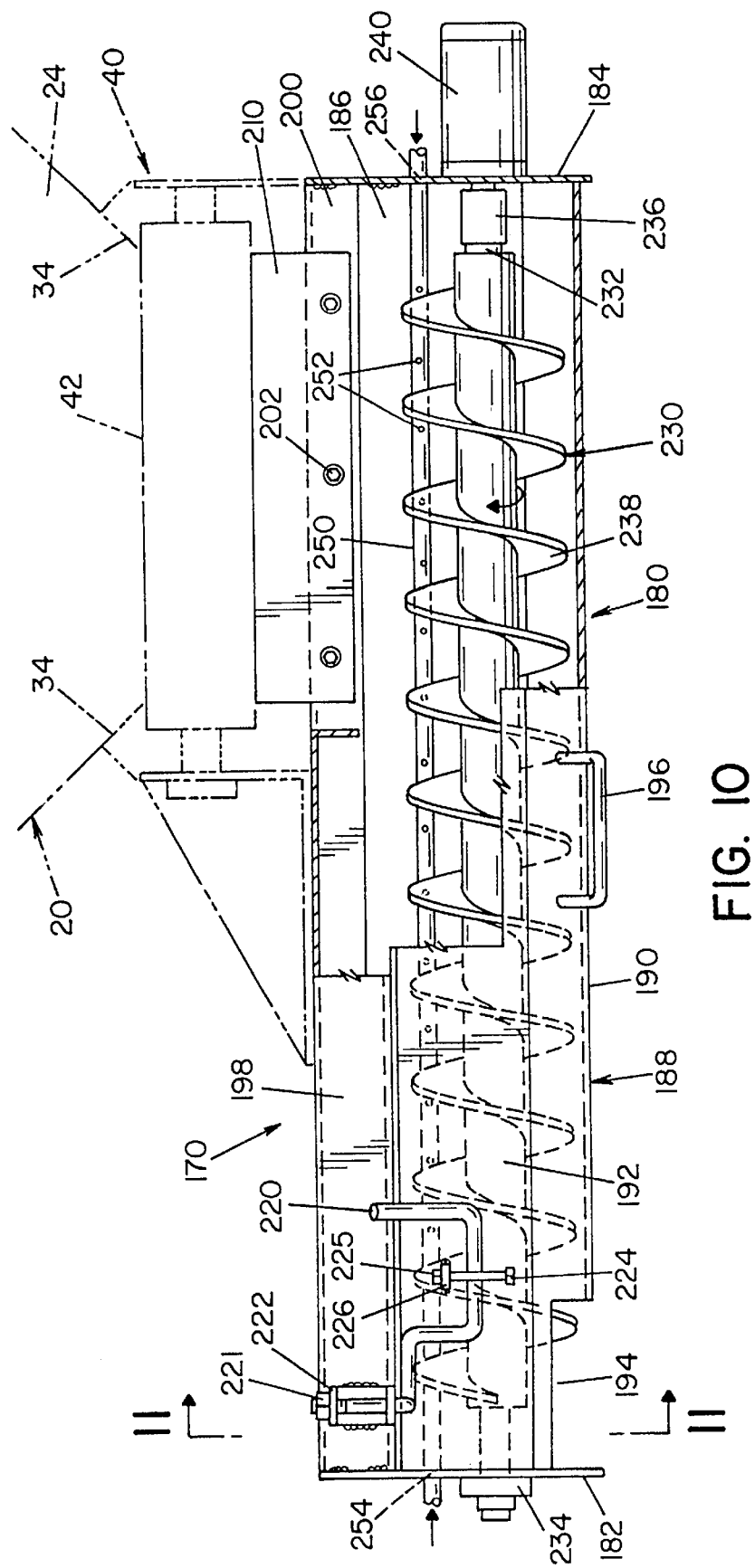
FIG. 10 is an enlarged rear sectional view of the guide arrangement shown in FIG. 2.
Figure 11:
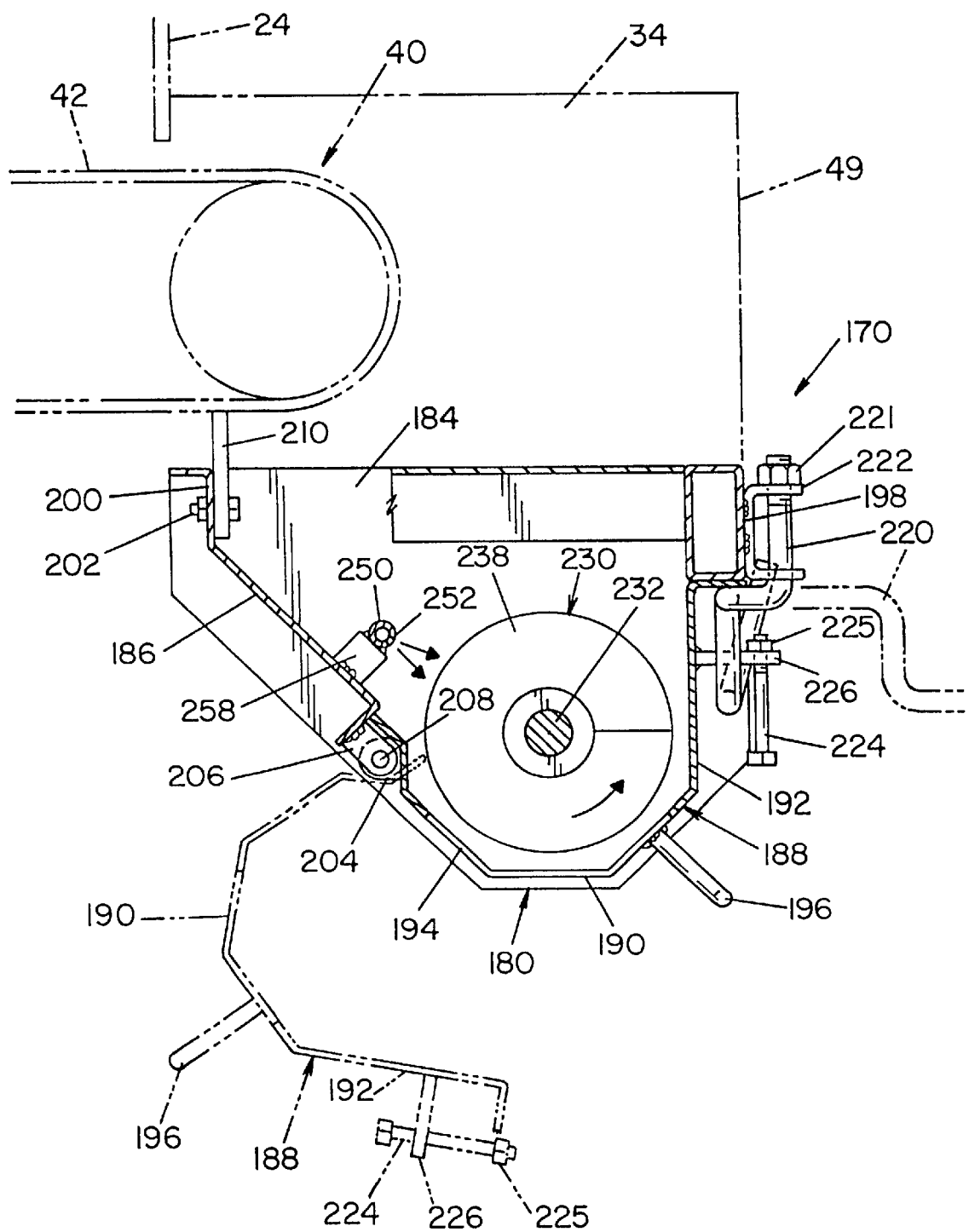
FIG. 11 is a cross-sectional view along line 11—11 of FIG. 10.

Referring now to FIGS. 2, 3, 10 and 11, guide arrangement 170 is mounted at a position closely adjacent to or rearwardly of rear wall 24. Guide arrangement 170 includes a trough 180 that is adapted to receive particulate materials passing through the opening in rear wall 24. At least a part of trough 180 is positioned below the end of conveyor belt 42 to capture most of the particulate material falling from the end of conveyor arrangement 40. Trough 18 is formed by two end walls 182, 184 and a rear wall 186, and a trough door 188. Trough door 180 has a base 190 and a front 192. As shown in FIGS. 3 and 11, base 190 has a wide V-shape configuration. At the left end of base 190 is a door opening 194. Secured to door front 192 is a door handle 196. Positioned above trough door 188 and connected between end walls 182, 184 is a front bar 198. Front bar 198 and rear wall 186 enhances the structural rigidity of trough 180. Extending upwardly from rear wall 186 is a mount flange 200. Guide arrangement 170 is secured in position by connecting mount flange 200 to mount bar 210 by mount bolts 202. Mount bar 210 is secured between conveyor rear flanges 49 that extend rearwardly from rear wall 24. Although not shown, the top of end walls 182, 184 can be secured to conveyor rear flange 49 to provide additional support to guide arrangement 170. As can be appreciated, guide arrangement 170 can be alternatively, or additionally, secured to a part of rear wall 24 and/or truck frame 18 of truck 10. The guide arrangement is designed so that it can be easily connected and secured to a standard spreader truck without having to modify the existing components on the spreader truck. By simply removing bolts 202, the guide arrangement is simply removed from truck 10. This simple mounting and de-mounting arrangement, facilitates in the maintenance and operation of the guide arrangement on the truck.

Referring now to FIG. 11, trough door 188 is moveable between an open and closed position. The bottom of trough door 188 includes a door hinge 204. Door hinge is pivotally connected to hinge flange 206 by a hinge pin 208. Hinge flange 206 is secured to the base of rear wall 186. Trough door 188 is secured in the closed position by bar latch 220. Bar latch 220 is swingably connected to front bar 198 by latch flange 222. Bar latch 220 is secured in latch flange 222 by a latch nut 221 screwed to one end of bar latch 220. Bar latch is locked into position by a latch pin 224 positioned on door front 192. Latch pin 224 is secured in positioned by inserting the latch pin in pin flange 226 which is connected to door front 192 and then screwing a pin bolt 225 onto one end of latch pin 224. Trough door 188 is opened by raising each latch pin 224 in pin flange 226 until the bottom of latch pin 224 is positioned above a portion of each bar latch 220. Each bar latch 220 is then rotated in latch flange 222 to allow trough door 188 to be moved into its open position as shown in FIG. 11. In the open position, the components of the guide arrangement can be cleaned, serviced and/or replaced. When securing the trough door in the closed position, trough door 188 is pivoted upwardly on door hinge 204 to move the top of door front 192 toward front bar 198. Each latch pin 224 in pin flange 226 is then raised until the bottom of latch pin 224 is positioned above a portion of each bar latch 220. Each bar latch 220 is then rotated in latch flange 222 to lock the trough door in the closed position. The latch pins are then allowed to fall into the pin flange thereby locking the bar latch in position. During the opening and closing of trough door 188, door handle 196 is used to controllably raise and lower the trough door.

Referring now to FIG. 10, an auger 230 is positioned in trough 180. Auger 230 has a shaft 232 with a cork-screw blade 238 attached thereto. Shaft 232 is secured at one end to end wall 182 by end mount 234. The other end of shaft 232 is coupled to auger motor 240 by coupler 236. Auger motor 240 can be a hydraulic or electric motor. The activation, deactivation and/or speed of auger motor 240 can be controlled manually, automatically and/or from a remote location. Auger 230 is designed to move particulate material in trough 180 along the interior of door base 190 until the particulate material exits trough 180 through door opening 194 in door base 190. Also positioned in trough 180 is a de-icer tube 250. De-icer tube 250 has a plurality of openings 252 to allow a de-icing agent to be applied to the particulate material while residing in the trough. De-icer tube 250 is inserted through passageways 254, 256 in each end wall 182, 184 of trough 180. Tube supports 258 also support de-icer tube 250 in the interior face of rear wall 186. The deicer solution can be one or a combination of different fluids that assist in melting ice when applied to ice and/or snow on a ground surface. The amount of deicer solution applied to particulate material in the trough can be controlled manually, automatically and/or from a remote location.

Referring now to FIG. 2, auger 230 is designed to transport particulate material received from conveyor arrangement 40 and move the particulate material laterally along the rear of the hopper until the particulate is properly positioned over material spreader 80. As the particulate material is being transported along the base of the trough by auger blade 238, auger blade 238 breaks up chunks of particulate material and/or mixes the deicing agent in the particulate material prior to the particulate material exiting through door opening 194. The breaking and/or mixing of the particulate material facilitates in conveying the desired form and consistency of particulate material to material spreader 80 just prior to the particulate material being spread onto ground surface A. The auger blade also reduces and prevents the clogging of door opening 194 with particulate material by constantly breaking up the particulate material in the trough. As shown in FIG. 10, auger blade 238 at least partially extends over door opening 194 to break and/or mix the particulate material passing through door opening 194.

Figure 15:
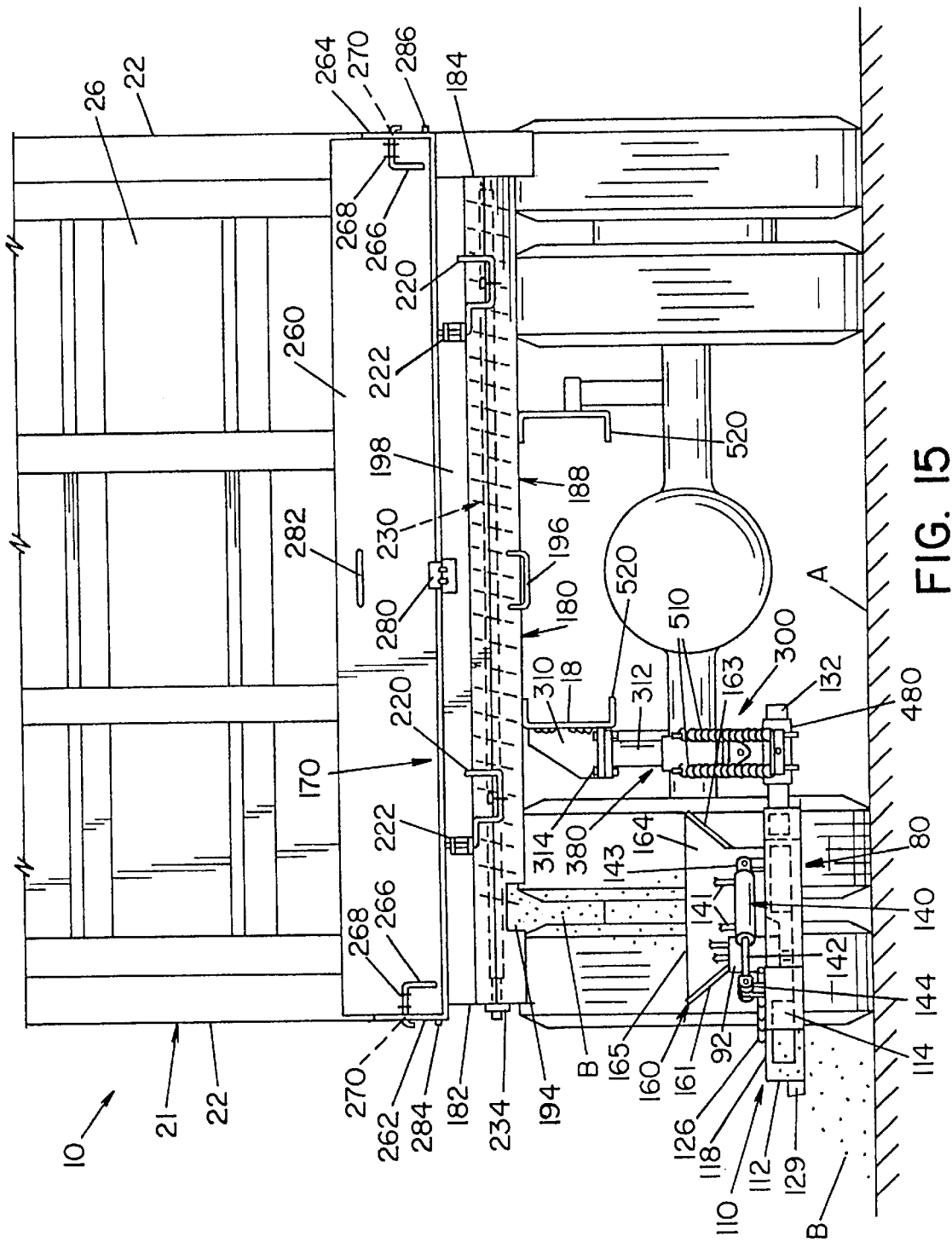
FIG. 15 is a rear view of a dump truck having a guide arrangement and material spreader arrangement connected to the dump truck in accordance with the present invention.
Figure 16:
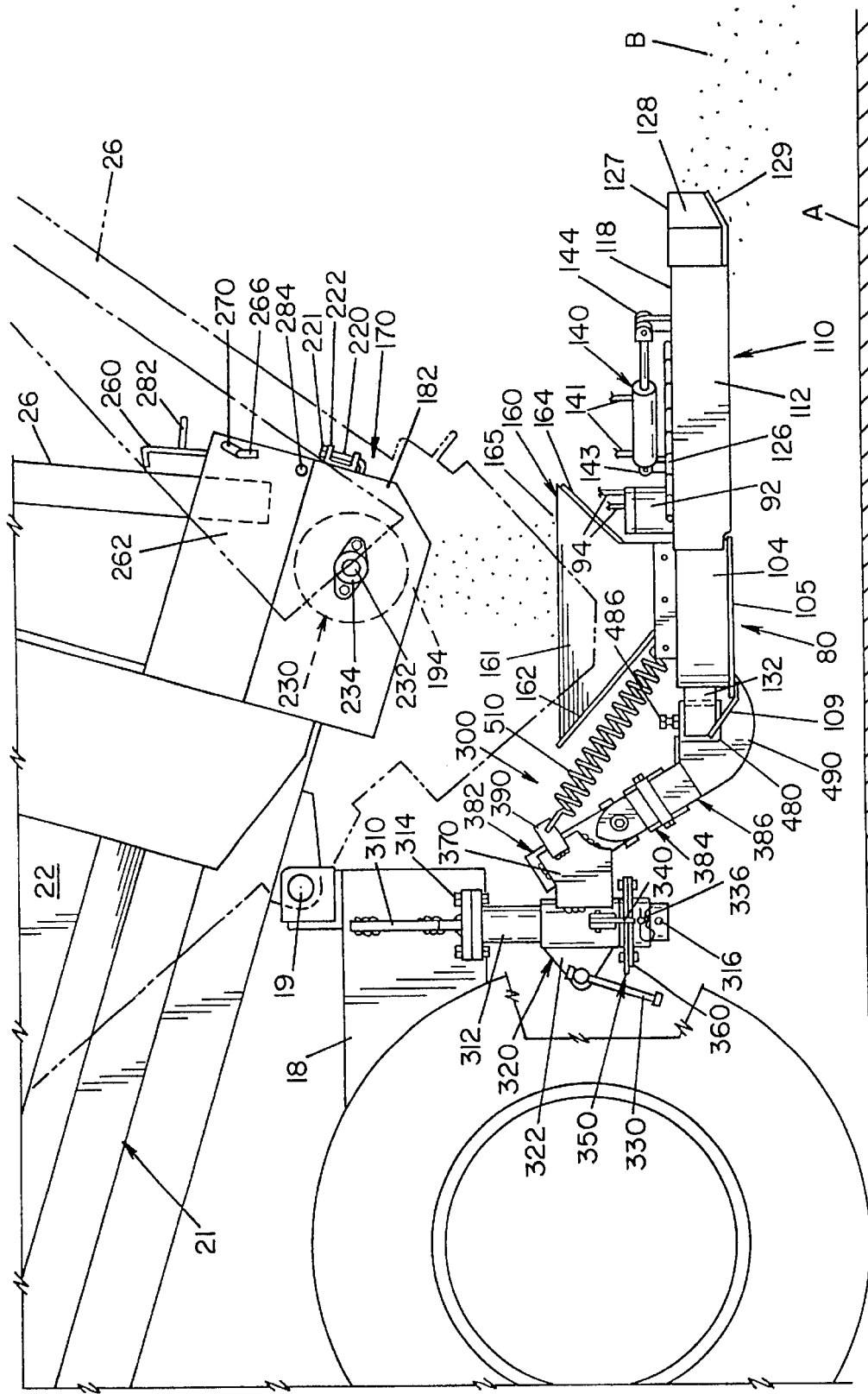
FIG. 16 is an enlarged side view of the dump truck of FIG. 15 showing the dump body in a tilted position.

Referring now to FIGS. 15 and 16, a modification to guide arrangement is shown. As shown in FIG. 15, truck 10 includes a dump body 21 having two side walls 22 and a pivoting tailgate 26 having a handle 28. Tailgate is a standard pivoting tailgate which pivots from the top edges of the dump body. Dump body 21 is pivotally mounted to truck frame 18 at truck pivot 19. The dump body is pivoted in a standard manner, such as by a hydraulic piston. Guide arrangement 170 is modified to be used in association with a standard dump truck. As a result, specially designed spreader trucks need not be used before being able to use the guide arrangement and material spreader of the present invention. Therefore, the versatility of standard dump trucks can be increased. Side walls 182, 184 are secured to side walls 22 by any of a number of means such as bolts, pins or the like. The components and operation of the guide arrangement are the same as shown and previously discussed in reference to FIGS. 2, 3, 10 and 11. The guide arrangement also includes an abutment door 260 which is designed to engage the base of tailgate 26 when the dump body is pivoted rearwardly as shown in FIG. 16. Abutment door 260 is secured to the top of front bar 198 by door hinge 280 and side hinges 284, 286. Abutment door 260 is designed to swing between an upward and downward position. Handle 282 secured to the front of abutment door 260 is used to move abutment door between the upward and downward position. Abutment door 260 is held in the upward position by door bolts 266. The door bolts are connected to abutment door 260 by bolt flanges 268. The end of door bolts 266 are inserted through bolt openings 270 in door flanges 262, 264 to secure the abutment door in the upward position. The abutment door is moveable to the downward position by moving the ends of the door bolts out of bolt openings 270 and then pivoting the abutment door on the door hinge and side hinges to the downward position. The movement of the abutment door in the downward position allows for easier access to the interior of trough 180 for purposes of cleaning, repair and/or maintenance. The downward position of the abutment door also allows for easy detachment or reattachment to the top of front bar 198. As shown in FIG. 16, the base of tailgate swings toward the interior surface of abutment door 270 when dump body 21 is pivoted rearwardly on track frame 18. As the tailgate pivots rearwardly, particulate material in the dump body flows into trough 180. The rear of tailgate 26 and the interior surface of abutment door 260 prevent the particulate material from inadvertently overflowing the top of guide arrangement 170. Door flanges 262, 264 also facilitate in maintaining the particulate material in trough 180 by inhibiting the particulate material from overflowing from the ends of the guide arrangement. As shown in FIG. 16, the dump body is pivoted in two positions to illustrate that the particulate material passing though opening 194 of trough door 188 is always directed into particulate funnel 160 of material spreader 80 when the material spreader is in the operational position.

Referring now to FIGS. 4, 12, 13, 15 and 16, particulate fennel 160 is shown to receive particulate material B that have passed through door opening 194. Particulate funnel 160 includes four inwardly sloped side walls 161, 162, 163, 164. The side walls slope inwardly thereby forming a relatively wide fennel opening 165 and a smaller deposit opening 168. The particulate fennel is designed to direct particulate materials that are received in funnel opening 165 to a specific location in material spreader 80. The edges of the side walls overlap so as to prevent particulate materials from escaping the interior of the particulate funnel as the particles pass between the funnel opening and deposit opening. The size of funnel opening 165 is large enough to capture substantially all of the particulate materials that pass through door opening 194. Referring now to FIG. 16, funnel opening 165 is sized to be large enough to receive substantially all the particulate materials passing through door opening 194 as dump body 21 pivots on truck pivot 19.

Figure 12:
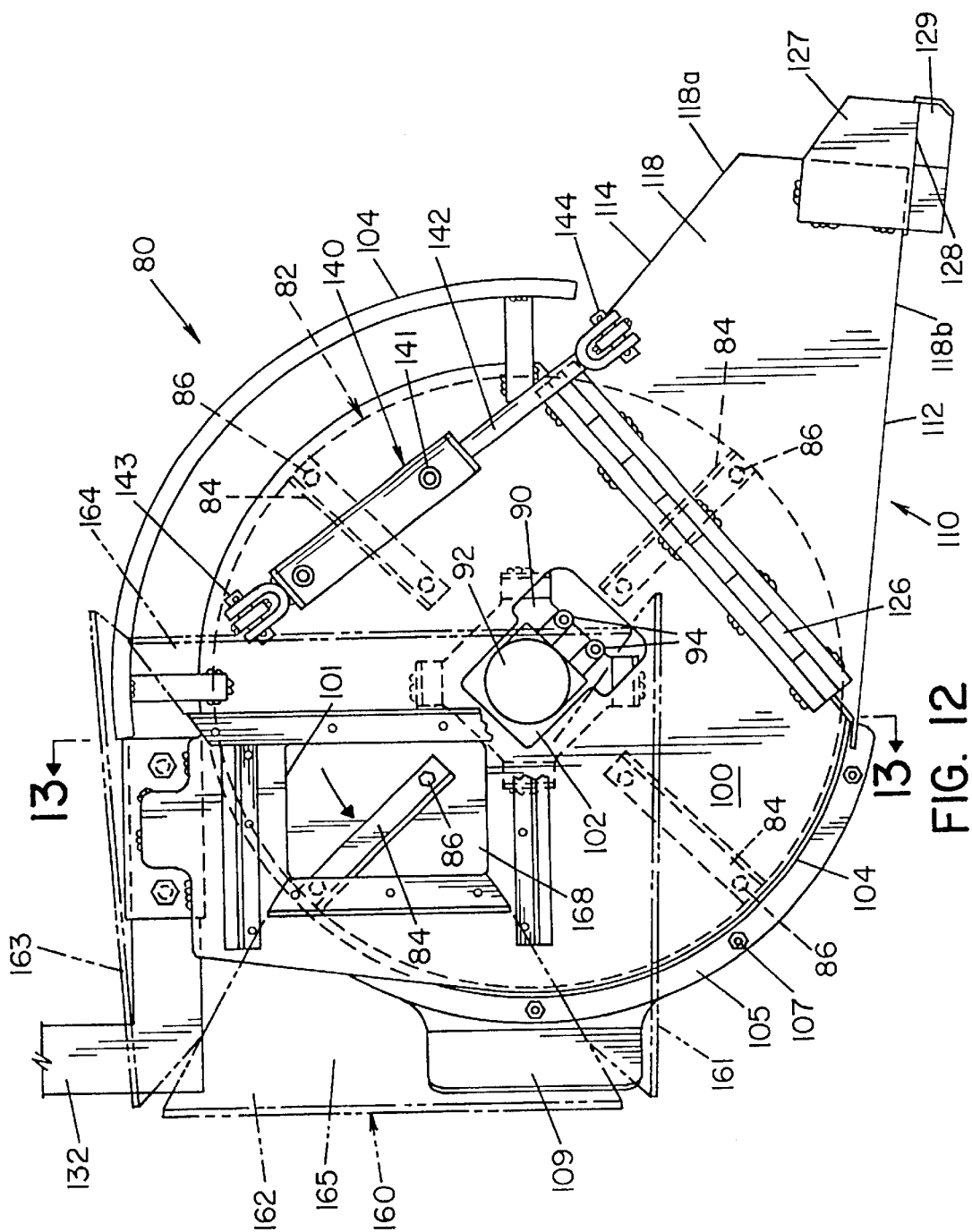
FIG. 12 is a top sectional view of the material spreader arrangement as shown in FIG. 2.
Figure 13:
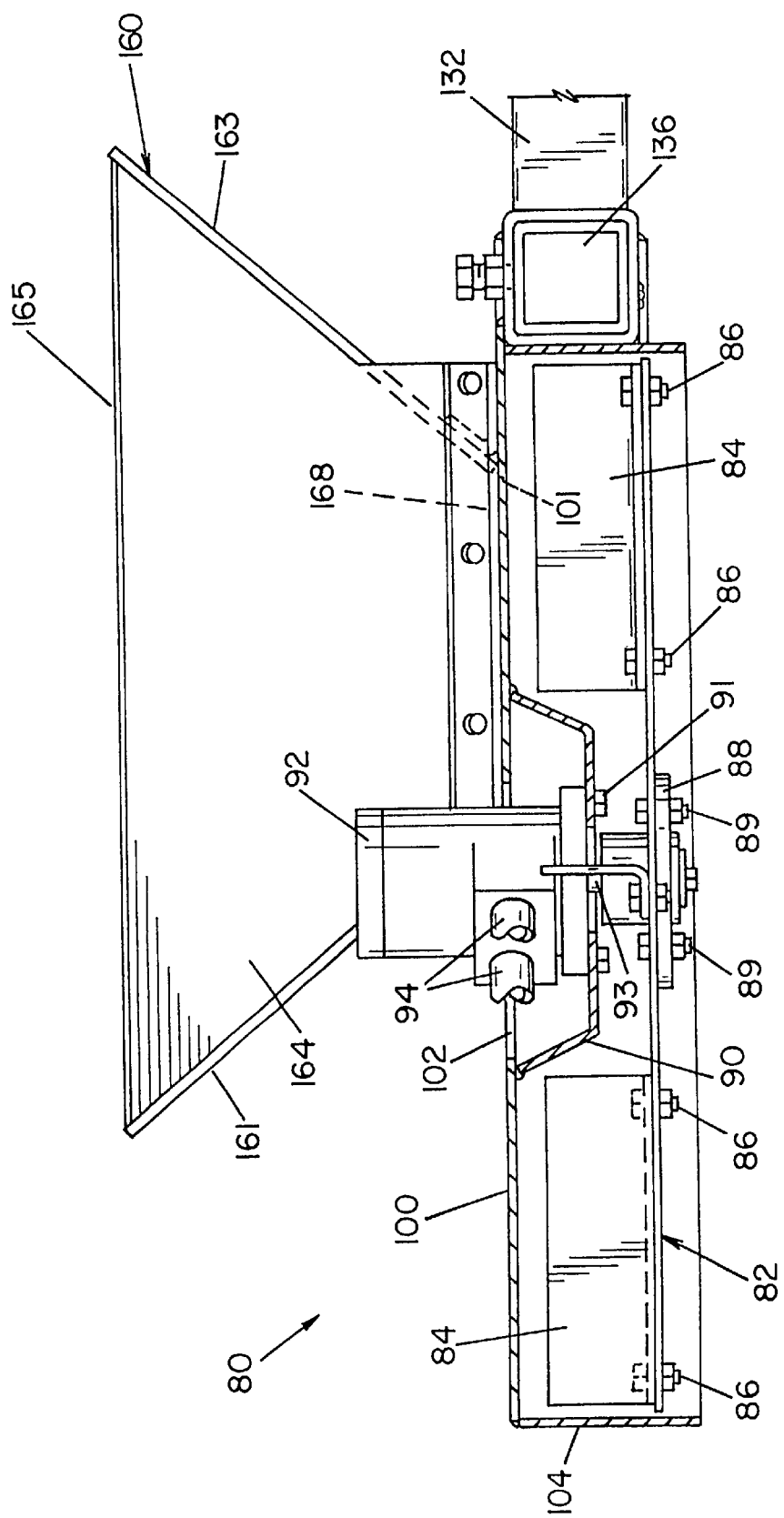
FIG. 13 is a cross-sectional view along line 13—13 of FIG. 12.

As best illustrated in FIGS. 12 and 13, material spreader 80 includes a disk 82 mounted onto a spreader motor 92. Spreader motor 92 is mounted to a motor mount 90 by bolts 91. Motor mount 90 is positioned below top plate 100 and the edges of the motor mount are connected to the underside surface of top plate 100. The top of spreader motor 92 extends through motor opening 102 of top plate 100. Spreader motor 92 has an axial member 93 that is connected to disk connector 88. Disk 82 is connected to disk connector 88 by bolts 89. Disk 82 includes four disk vanes 84 which are mounted to the disk by vane bolts 86. More vanes can be used, but too many vanes may cause too much bounce as the particulate material is deposited onto ground surface A.

Disk 82 can be driven clockwise or counterclockwise by the positive displacement type hydraulic disk motor 92 to propel the particulate material to the left or right side of spreader 80. Disk motor 92 includes motor fluid lines 94 which supply hydraulic fluid for driving the motor which rotates disk 82. Although not shown, fluid lines 94 are connected to a pump and a fluid reservoir. A valve may also be attached to fluid lines 94 to control the flow of fluid to disk motor 92.

Material spreader 80 includes a side plate 104 which is connected to the edge of top plate 100. Side plate 104 extends below the surface of top plate 100 to at least the plane in which the disk rotates. Additionally, side plate 104 extends about the perimeter of disk 82 so as to create a retaining wall around the disk extending from the side of the disk around through the back of the disk to the other side of the disk. Side plate 104 is positioned closely adjacent to the disk so as to retain material deposited on the disk from funnel receptacle 160 until the disk has propelled such materials through the backside of material spreader 80. One function of side plate 104 is to direct the materials flowing through particulate opening 101 in top plate 100 onto the surface of disk 82.

Connected by bolts 107 to at least a portion of the bottom edge of side plate 104 is a base flange 105. Connected to base flange 105 is a side skid plate 109. Side skid plate 109 has a sloped edge. Side skid plate 109 is designed to reduce damage to side plate 104 of material spreader 80. The side skid plate lifts the material spreader above an object that projects above the ground surface A (i.e. curb, rocks) when truck 10 is moving forward. The sloped surface of side skid plate 109 facilitates in lifting the side plate 104 over the object and reduces or prevents the occurrences that the face of the side plate directly contacts an object on ground surface A which could result in damage to material spreader 80 or other components of and/or connected to truck 10.

A lift bar 132 is connected to top plate 100 and extends outwardly from the surface of the top plate. Lift bar 132 includes a lift bar opening 136 positioned longitudinally through lift bar 132. Lift bar 132 is adapted to receive a bar connected to a lifter so that material spreader 80 can be easily connected to or removed from truck 10.

Figure 4:
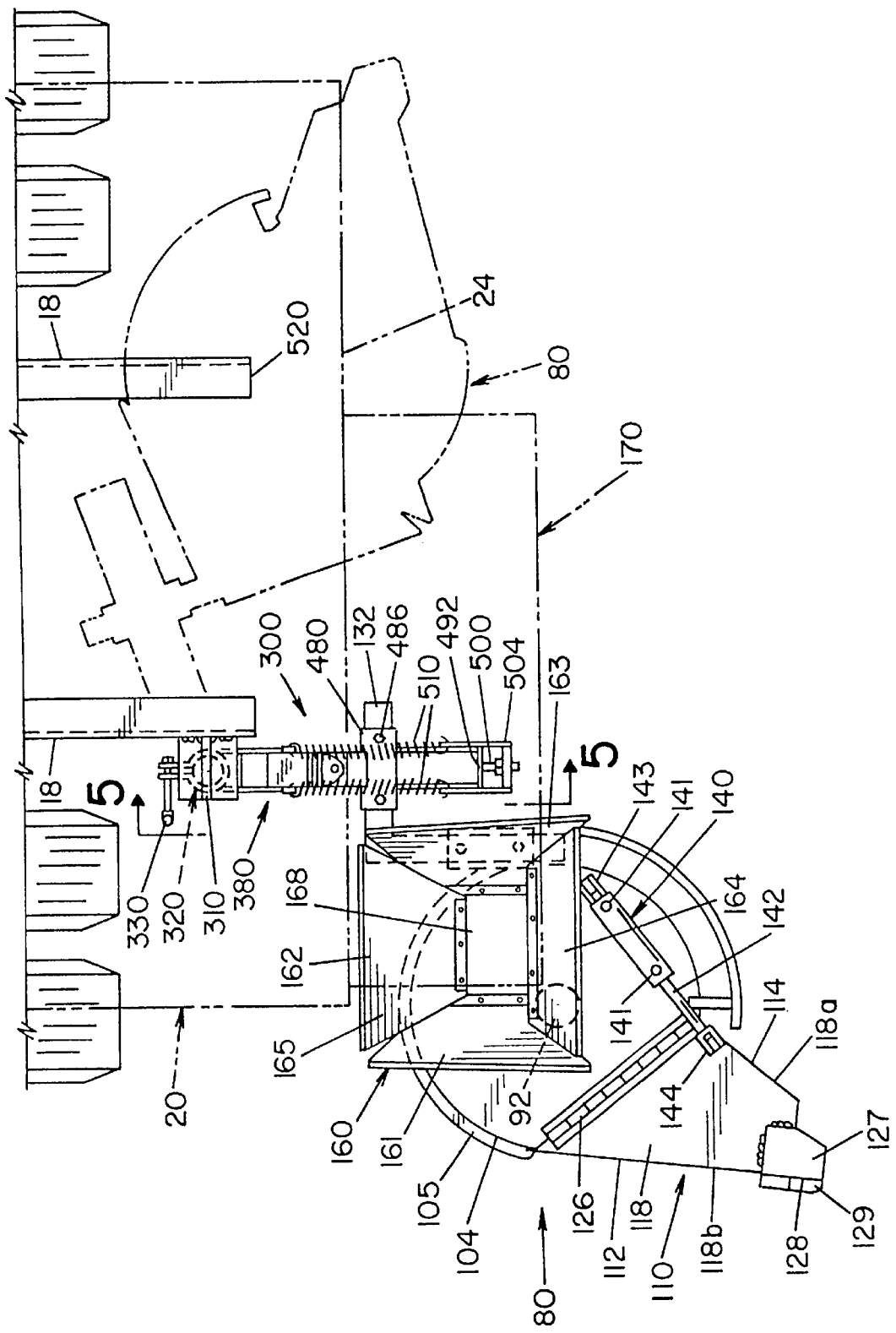
FIG. 4 is a partial top of the material spreader arrangement as illustrated in FIG. 2 which shows the material spreader arrangement moveable between an operational and stored position.

Connected to top plate 100 of material spreader 80 is material guider 110. Material guider 110 is positioned above ground surface A and lies in a plane substantially parallel to the ground surface. The bottom edge of the material guider 110 is positioned at a sufficiently close distance to the ground to minimize the width of the strip or swath of particulate material being deposited on the ground surface by the material guider. Material guider is generally spaced less than about 24 inches from the ground surface and typically about 2 to 14 inches from the ground surface. Material guider 110 includes a planar guide side 112 which is positioned closely adjacent to one end of side plate 104. Material guider 110 also includes a top plate 118. Top plate 118 includes two sides 118a and 118b that extend at least partially in a non-parallel relationship to one another. Side 118b is connected to the top of side plate 112. Side 1 18a is connected to the top of inner plate 114. Top plate 118 of material guider 110 is connected to top plate 100 of material spreader 80 and lies in a plane substantially the same as the plane as top plane 100 when material guide is in the engagement position. As shown in FIG. 4, the wide end of top plate 118 is positioned closest to disk 82 of material spreader 80. This design of material guider 110 forms a wide passageway opening positioned closely adjacent to disk 82 which passageway narrows until the particulate material exits the material guider. In one preferable dimensional arrangement of the material guider, guide side 112 is about 12–26 inches in length, the height of side plate 112 and inner plate 114 is about 4–8 inches, and the angular passageway narrows from a width of about 8–16 inches to a width of about 4–8 inches.

Referring now to FIGS. 3 and 4, the end of material guider 110 has a guide plate 127. Guide plate 127 functions as a partial extension of top plate 118. A guide side plate 128 is secured to the underside edge of guide plate 127 and to the side of side plate 112. Guide side functions as a partial extension of the side plate. Secured to the base of guide side plate 128 is a skid plate 129. Skid plate 129 includes an angular section that extends upwardly. Side skid plate 129 is designed to reduce damage to material guider 110. The side skid plate lifts the end of material guider above an object that is projecting above the ground surface A (i.e. curb, rocks) when truck 10 is moving backward or forward. The sloped surface of skid plate 129 facilitates in lifting material guider 110 over the object and reduces or prevents the occurrences that end of the material guider directly contacts an object on ground surface B which could result in damage to material guider 110, material spreader 80 or other components of and/or connected to truck 10.

Referring now to FIG. 3, top plate 118 of material guider 110 is pivotally mounted to top plate 100 of material spreader 80. Such lifting and lowering of material guider 110 with respect to material spreader 80 is accomplished by a hydraulic lifter 140. Hydraulic lifter 140 includes a piston 142. Fluid tubes 141 are connected to hydraulic lifter to move piston 142. Piston 142 is connected to guide top plate 118 by piston hinge 144 and the end of hydraulic lifter 140 is connected to the top of top plate 100 by hinge 143. Top plate 118 is hingeably attached to spreader top plate 100 by hinge 126. When piston 142 is extended, material guider 110 is in the engaged position as shown in FIG. 3. When piston 142 is in the retracted position, material guider 110 is in the unengaged position as shown by the phantom lines in FIG. 3. When material guider 110 is in the engaged position, the mode of spreading is precision placement spreading wherein the particulate material is deposited onto the ground surface in a narrow band. When material guider 110 is in the unengaged position, spreader 80 is converted into a broadcast type spreader which disperses particulate material over a wide area of the ground surface during operation. When the material guider is in the precision placement mode or broadcast mode, the rotational speed of the disk is preferably adjusted for the particular mode of operation. Preferably, the rotational speed of the disk is less for broadcast mode than for precision placement mode of spreading. The spin direction of the disk can be controlled to achieved the designed spreading patterns of the particulate material on the ground surface. Preferably, the disk rotates in a counter-clockwise direction when the material spreader is positioned in the center or to the left side of the truck (as seen from the rear of the truck) and the material spreader is in the precision placement mode. Preferably, the disk rotates in a clockwise direction and when the material spreader is positioned in the center or to the left side of the truck (as seen from the rear of the truck) and when the material spreader is in the precision placement mode. However, the disk can rotate in the same direction for both modes of spreading. The lifting and/or lowering of the material guider, the speed of disk rotation, and/or the direction of disk rotation can be manually, automatically and/or remotely controlled.

The design of the material guider enables particulate material to be deposited on the ground surface at substantially zero velocity relative to the ground surface. Such zero velocity spreading can be achieved at truck velocities substantially exceeding 35 mph and at speeds up to 45–70 mph.

By allowing the truck to travel at higher speeds, a larger area of ground surface can be treated. In addition, the higher truck speeds will reduce the chance of rear end collision on roads. During operation, very little particulate material bounce will occur and a substantially large amount of the particulate material stays within a 1–4 foot swath when deposited on the ground surface. The material guider is designed so as not to substantially reduce the velocity of the material as it travels through the material guider. This design enables increased velocities of the truck while still maintaining zero velocity spreading.

Figure 5:
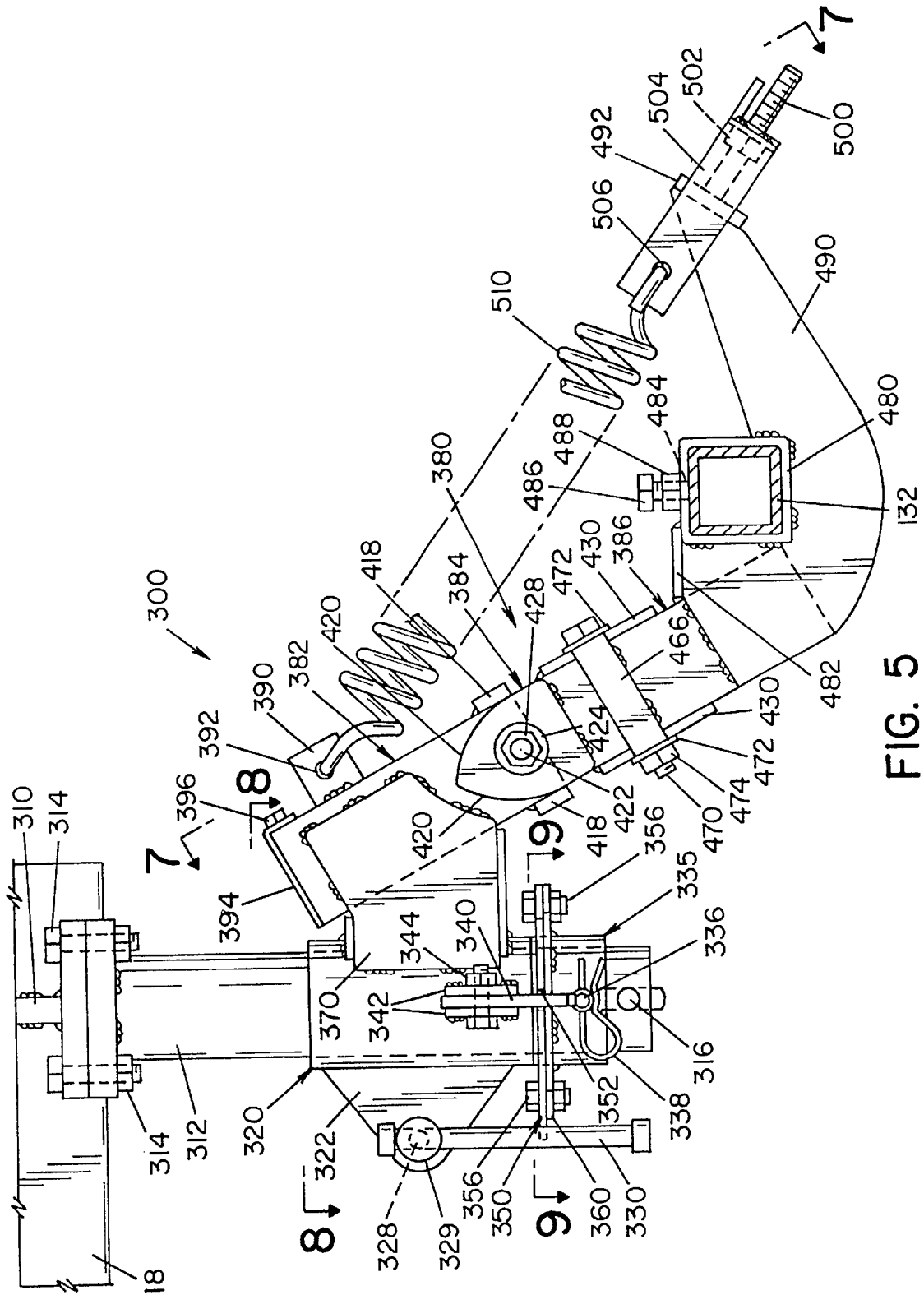
FIG. 5 is a cross-sectional view along line 5—5 of FIG. 4.

Material spreader 80 is mounted to truck 10 by an improved spreader mount 300. Spreader mount 300 is best illustrated in FIGS. 5–9. Referring now to FIG. 5, spreader mount 300 has a shaft flange 310 secured to truck frame 18 by a weld. Connected to shaft flange 310 is a mount shaft 312. Mount shaft 312 is connected to shaft flange by bolts 314. Mount shaft 312 is a cylindrically shaped member that extends downwardly from shaft flange 310 and truck frame 18. Mount shaft 312 includes a plurality of shaft openings 316.

Figure 8:
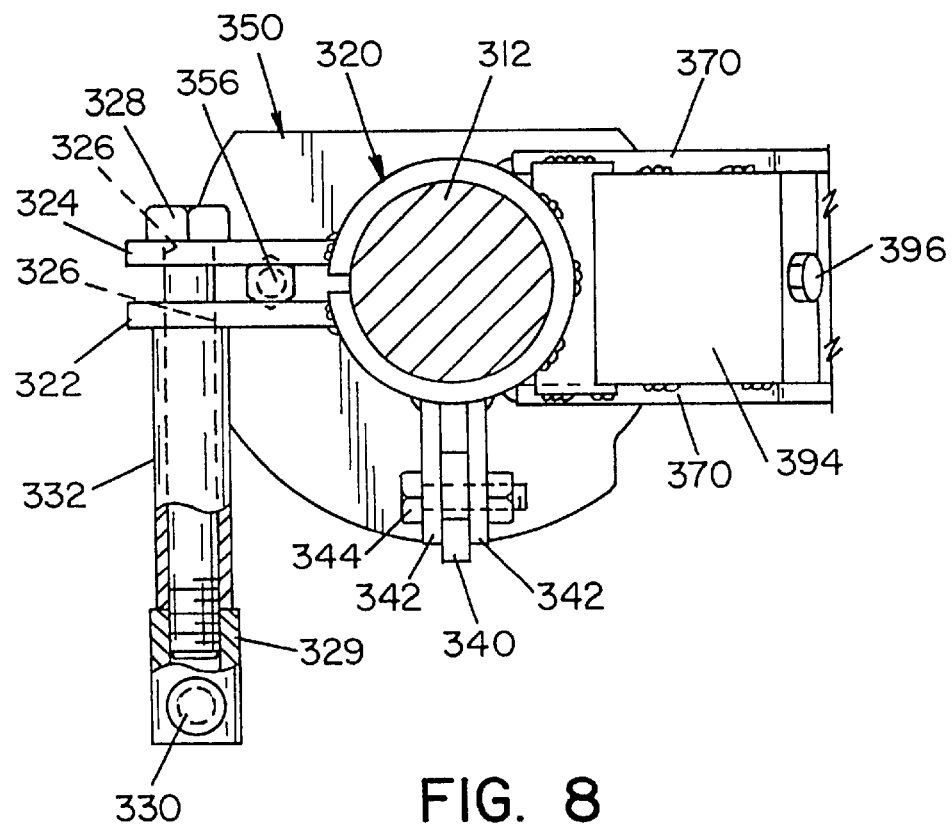
FIG. 8 is a cross-sectional view along line 8—8 of FIG. 5.
Figure 9:
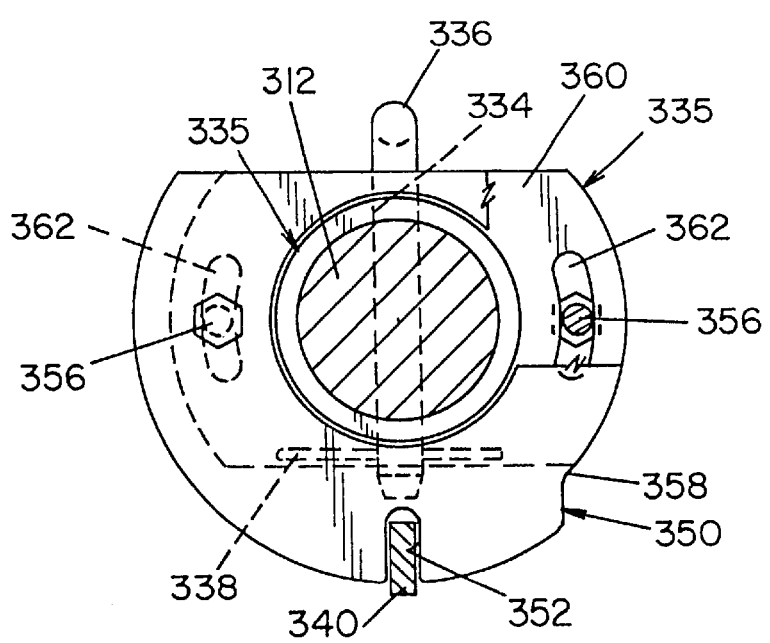
FIG. 9 is a cross-sectional view along line 9—9 of FIG. 5.

Rotatably positioned about mount shaft 312 is a positioning bracket 320. Positioning bracket 320 includes two clamp flanges 322, 324. Each clamp flange has a flange opening 326 wherein a clamp bolt 328 is inserted there through. As best shown in FIG. 8, a bolt sleeve 332 is positioned about a portion of clamp bolt 328 between clamp flange 322 and clamp nut 329. clamp nut is rotated on the threaded end of clamp bolt 328 by a tightening lever 330. Positioning bracket 320 is rigidly secured to mount shaft by turning clamp nut 329 with tightening lever 330 to cause bolt sleeve to press against clamp flange 322 and force clamp flanges 322 and 324 together thereby rigidly securing positioning bracket in a position on mount shaft 312. Positioning bracket 320 can once again be moveable about mount shaft 312 by rotating clamp nut 329 in the opposite direction by tightening lever 330.

Referring again to FIG. 5, the vertical position of positioning bracket 320 on mount shaft 312 is maintained by bracket disk 335. Bracket disk 335 is a cylindrically shaped member that can be moved along the vertical axis of mount shaft 312. Bracket disk has a disk opening 334 through which a disk bolt 336 can be inserted. As shown in FIG. 5, disk opening 334 on both sides of bracket disk 335 is aligned with one set of holes 316 in mount shaft 312. Once opening 334 and hole 316 are aligned, disk bolt is inserted through the opening and hole is locked in place by bolt pin 338. Welded to the top edge of bracket disk 335 is plate flange 360. Plate flange has two slots 362 designed to receive bolts 356. Rotatably positioned on top of plate flange 360 is position plate 350. Secured to position plate 350 are bolts 356. The rotation of position plate 350 about mount shaft 312 is limited by slots 362 in plate flange 360. Position plate is rigidly secured in place relative to plate flange 360 by tightening bolts 356. As shown in FIG. 5, the bottom edge of positioning bracket 320 rest upon the top surface of bracket disk 335. By adjusting the vertical position of bracket disk 335 on mount shaft 312, the vertical position of positioning bracket 320 is also adjusted on mount shaft 312.

Referring now to FIG. 8, position plate 350 has a plate notch 352 and a recessed section 358. Plate notch 352 is adapted to receive a portion of a latch arm 340 that is connected to positioning bracket 320. Latch arm is designed to move outwardly from positioning bracket 320 and is connected to positioning bracket 320 by arm flanges 342 and arm bolt 344. Position plate 350 is designed to define a desired position for positioning bracket 320. As discussed above, positioning plate 350 is adjustable about the perimeter of mount shaft 312. The adjustable positioning of the positioning plate is to enable a user to set the position of the plate notch relative to the mount shaft. The position of the plate notch defines the desired position of the positioning bracket 320 about the perimeter of mount shaft 312. As illustrated in FIGS. 5 and 8, when positioning bracket 320 is positioned in the desired location about mount shaft 312, a portion of latch arm 340 is aligned with plate notch 352 and thereby can be slipped into the plate notch. Once the latch arm is inserted in plate notch 352, positioning bracket 320 is prevented from further rotation about mount shaft 312. Tightening lever is then used to clamp the positioning bracket 320 to mount shaft 312. When positioning bracket 320 is to be moved about mount shaft 312, tightening lever is rotated to unclamp positioning bracket on mounting shaft 312, and latch arm 340 is lifted out of plate notch 352. The plate recess 358 on position plate 350 allows latch arm 340 to hang downwardly when the positioning bracket is rotated about mount shaft 312.

Figure 8A:
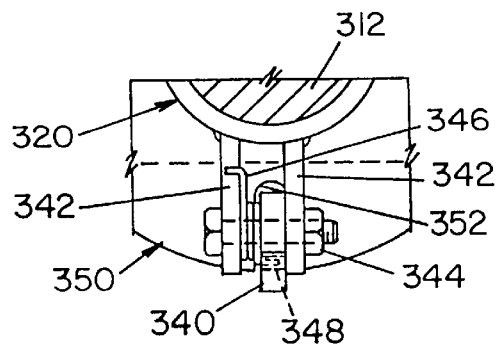
FIGS. 8A–8C are an alternate embodiment of the clamping bracket mechanism shown in FIG. 8.
Figure 8C:
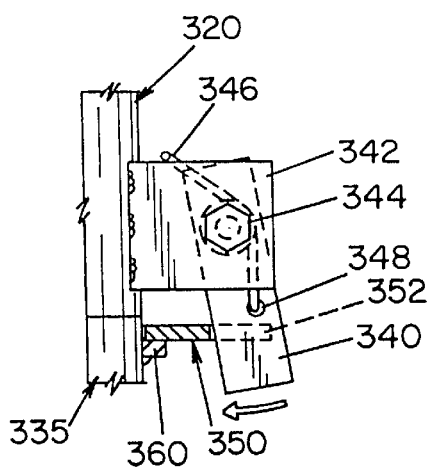
Figure 8B:
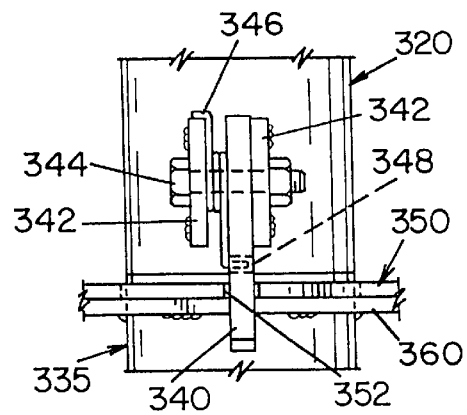

Referring now to FIGS. 8A–8C, a modification to the latch arm is shown. Latch arm 340 is biased in a downward position by arm spring 346. One end of spring 346 rests on the top surface of one arm flange 342 and the other spring end is secured to latch arm 340 by inserting the end through spring opening 348. The biasing of the latch arm in the downward position facilitates in preventing the latch arm from inadvertently popping out of plate notch 352 during the operation of truck 10.

Figure 9A:
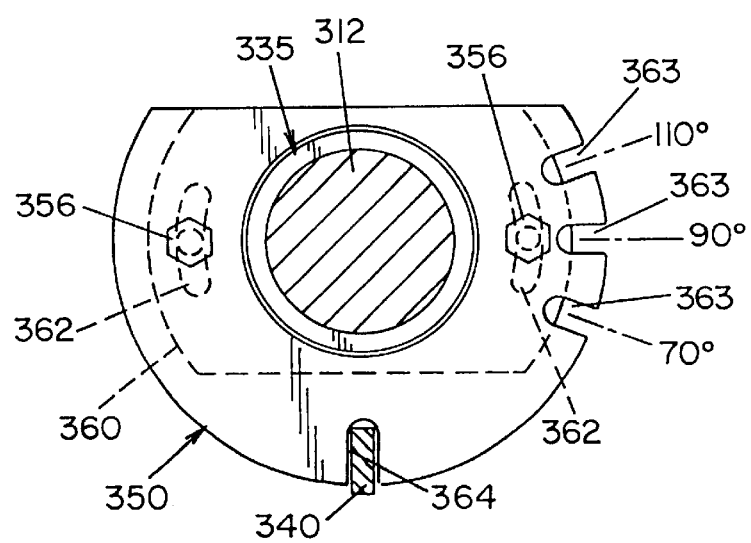
FIG. 9A is an alternate embodiment of the bracket locator shown in FIG. 9.

Referring now to FIG. 9A, a modification to position plate 350 is shown. In this embodiment, the plate recess is substituted for several secondary plate notches 363. These secondary plate notches enable the positioning bracket to be locked in position in other locations about mount shaft 312. In one type of operation, plate notch 364 defines the position in which material spreader 80 is in the operational mode, and secondary notches 363 define the position in which the material spreader is in the storage or non-operational mode. As can be appreciated, a plurality of notches 364 can be used to define a plurality of operational positions for the material spreader.

Figure 6:
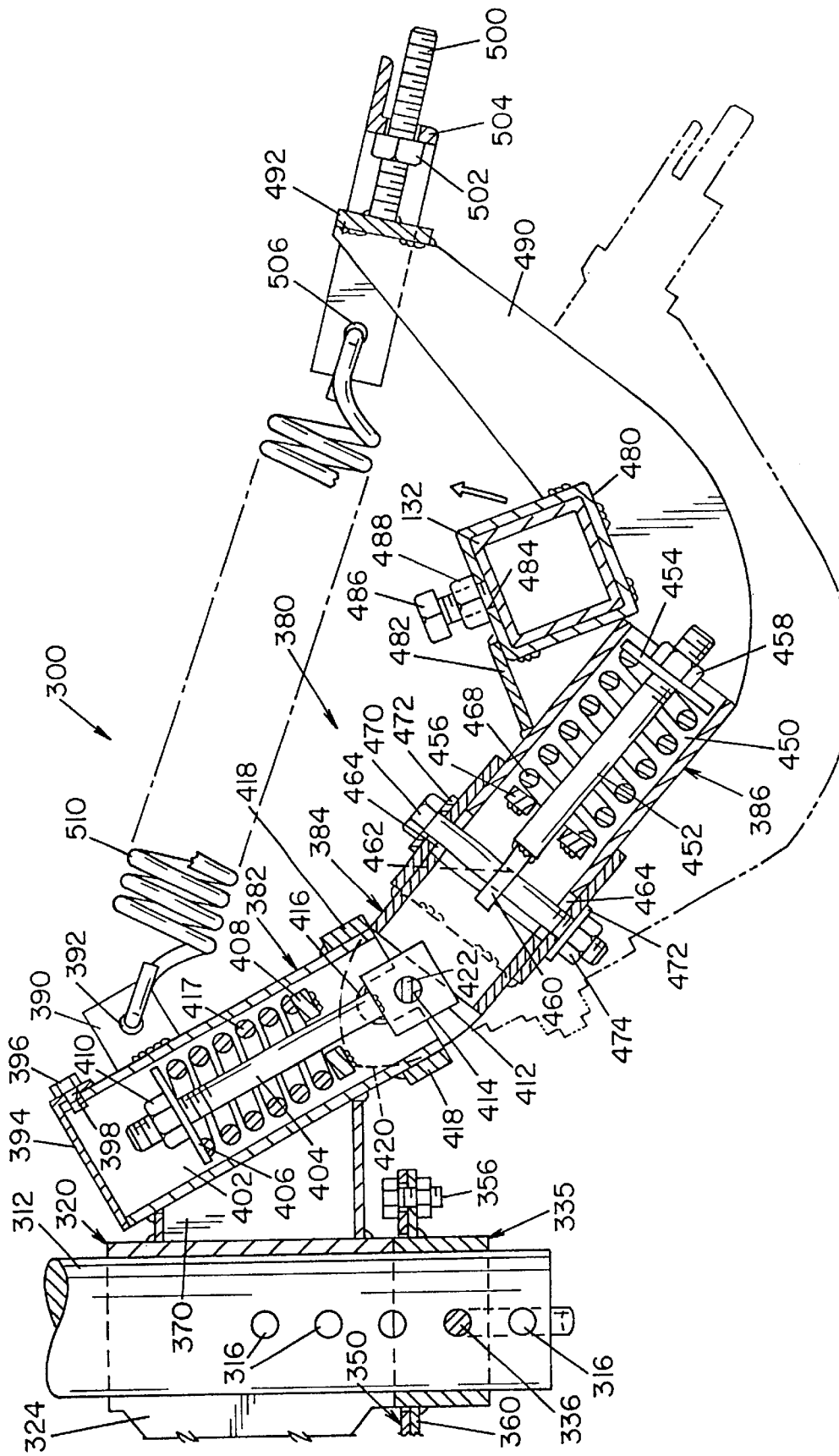
FIG. 6 is a side view of the spreader mount illustrated in FIG. 5 showing a portion of the spreader mount moveable into a vertical position.
Figure 7:
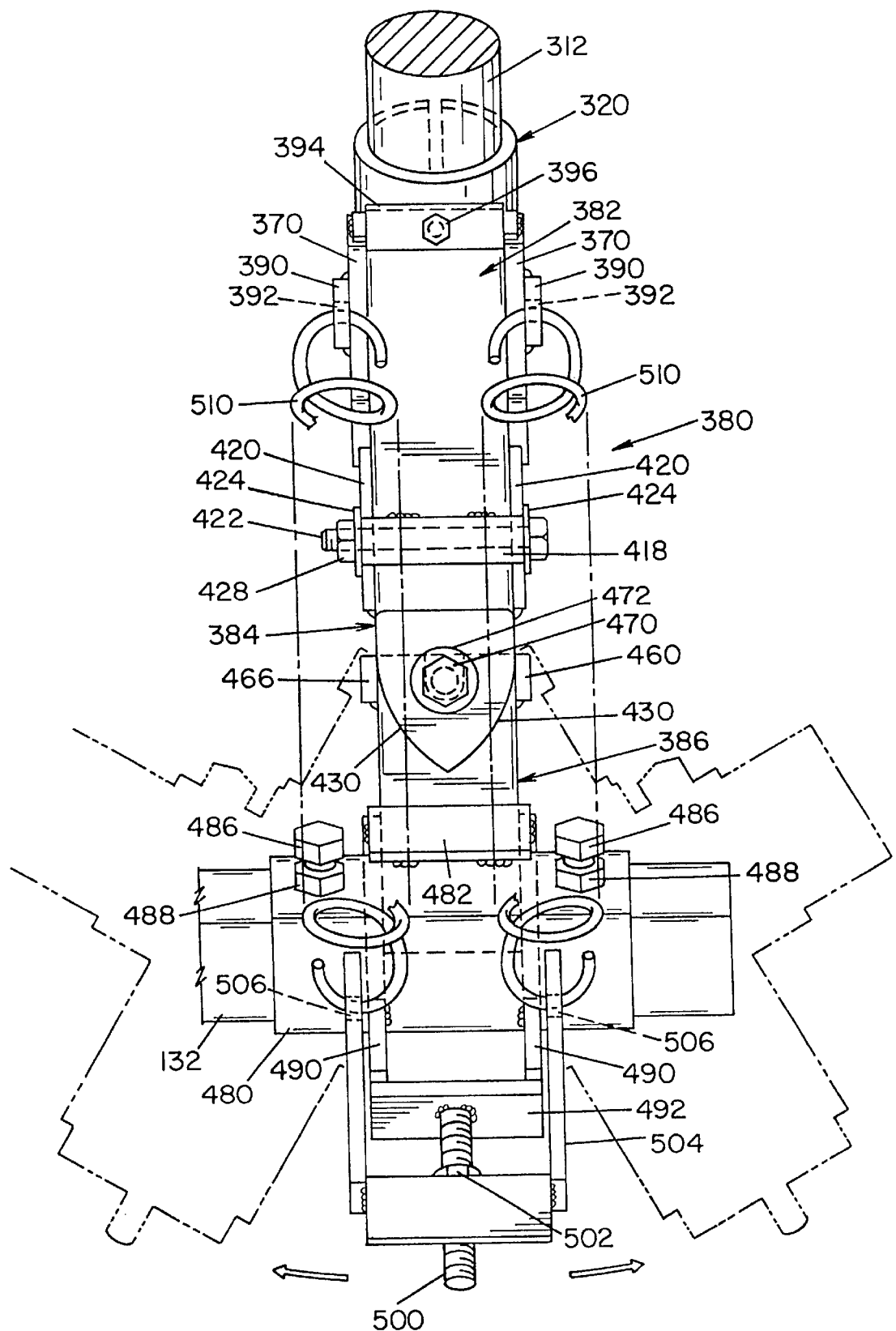
FIG. 7 is a cross-sectional view along line 7—7 of FIG. 5.

Referring to FIG. 5, positioning bracket 320 has two leg flanges welded to the positioning bracket. The ends of leg flanges 370 are in turn welded to upper leg section 382 of extension leg 380. The end of extension leg 380 is connected to material spreader 80. Referring now to FIGS. 5–7, extension leg 380 includes three sections, namely an upper leg section 382, a middle leg section 384 and a lower leg section 386. The three sections of extension leg 380 are designed to enable material spreader to move upwardly, downwardly and/or laterally during operation while positioning bracket 320 is locked about mount shaft 312 and after a predetermined amount of force is encountered by the material spreader and/or material guide. This allowed movement by the extension leg helps to minimize damage to the truck and/or components of the material spreading system.

Referring to FIG. 6, upper leg section 382 has two spring flanges 390 which each have an opening 392 to receive an end of stabilizer spring 510. Positioned near the lower end and on each side of upper leg section 382 are two side flanges 418. Upper leg section 382 also has an inner chamber 402 and a top plate 394 covening the inner chamber. Top plate 394 is secured in position by use of a plate bolt 396 inserted through a plate opening 398 in top plate 394. Positioned within inner chamber 402 is a tension rod 404. The head 412 of tension rod 404 has an opening 414 to receive a bolt 422. Bolt 422 is secured to an upper section of middle leg section 384. The ends of bolt 422 pass through the upper sides of middle leg section 384 and are secured in position by washers 424 and bolt nut 428. When upper leg section 382 and middle leg section 384 are in longitudinal alignment with each other, bolt 422 rests in tension slot 416 of upper leg section 382. Tension rod has a threaded end wherein a tension nut is screwed thereon. A tension spring 417 is positioned about the body of tension rod 404 and held in position between spring plate 408 and tension plate 406. Spring plate is welded to the lower interior side of upper leg section 382. The force on tension spring 417 is adjusted by turning tension nut 410 to cause tension plate 406 to move toward or away from spring plate 408. When the force on tension spring 417 is to be adjusted, top plate 394 is removed to allow access to tension nut 410.

Middle leg section 384 has two top sloped sections 420 positioned on the top portion of the middle leg section. When upper leg section 382 and middle leg section 384 are in longitudinal alignment with each other, the base portion of the two top sloped sections are positioned between side flanges 418 of upper leg section 382. Middle leg section also includes two bottom sloped surfaces 430 on the lower section of the middle leg section. The top sloped sections 420 and bottom sloped sections 430 are oriented about 90° with respect to one another. Each bottom sloped section has an opening to receive bolt 470. Bolt 470 is secured to the bottom sloped sections by washers 472 and bolt nut 474.

Lower leg section 386 has two side flanges 466 positioned on each side the upper portion of the lower leg section. When middle leg section 384 and lower leg section 386 are in longitudinal alignment with each other, the base portion of bottom sloped sections 430 are positioned between side flanges 466 of lower leg section 386 as shown in FIG. 7. Lower leg section 386 has an inner chamber 450. Positioned in inner chamber 450 is a tension rod 452. Tension rod 452 has a bolt head 460 having an opening 462. A portion of the body of bolt 470 extends through head opening 462. Two tension slots 464 are located on the upper side portion of lower leg section 386. As shown on FIG. 6, bolt 470 passes through tension slots 464. Tension rod 452 has a threaded end wherein a tension nut 458 is screwed thereon. A tension spring 468 is positioned about the body of tension rod 452 and held in position between spring plate 456 and tension plate 454. Spring plate is welded to the upper interior side of lower-leg section 386 and below slot 464. The force on tension spring 468 is adjusted by turning tension nut 458 to cause tension plate 454 to move toward or away from spring plate 456.

Connected to the base of lower leg section 386 are a pair of spring arms 490. Spring arms 490 curve under spreader coupler 480 and a portion of the top edge of the spring arm is welded to the base of spreader coupler 480. Each end of spring arm 490 includes an arm leg 492. Connected to the bottom of each arm leg is a tension bolt 500. Positioned on each tension bolt 500 is a spring flange 504 and tension nut 502. The spring flange is moved along tension bolt 500 by rotating and moving tension nut 502 on threaded tension bolt 500. Spring flange 504 includes an opening 506 to receive an end of each stabilizer spring 510. The moving of spring flange 504 on tension bolt 500 alters the tension of stabilizer springs 510.

Lower leg section 386 also has a coupler flange 482 which is secured to spreader coupler 480. Coupler flange 482 and spring arm 490 maintain the spreader coupler in position with respect to lower leg section 386. Spreader coupler has an interior cavity that is shaped to receive a portion of lift bar 132. Spreader coupler has a lock bolt 486 which screws into threaded coupler opening 484 to lock lift bar 132 in spreader coupler 480. A lock nut 488 is positioned on lock bolt 486 to inhibit the rotation of lock bolt 486 when the end of the lock bolt is engaged with lift bar 132.

As illustrated in FIGS. 3 and 6, spreader mount 300 enables the material spreader 80 to move upwardly and downwardly upon the material spreader or material guide encountering a predetermined force. A small of amount of upward and downward movement is allowed by stabilizer springs 510 during the operation of the material spreader. As truck 10 travels over a ground surface, the truck will encounter uneven surfaces. These uneven surfaces will cause the truck to bounce. These small bounces are stabilized by the stabilizer springs 510 thereby resulting is less upward and downward movement of the material spreader during operation. However, when the truck moves over a deep pothole causing the rear of the material spreader or material guider to contact the ground and/or the material spreader or material guider contacts an object so the spreader mounts allow for larger movement of the material spreader. In order to minimize or prevent damage to the material spreader or material guider, middle leg section 384 of extension leg 380 can move upwardly out of longitudinal alignment with upper leg section 382 as shown in FIG. 6. The force necessary for middle leg section 384 to move upwardly out of longitudinal alignment with upper leg section 382 is controlled by adjusting the tension on tension spring 417.

As shown in FIG. 6, as middle leg section moves relative to upper leg section 382, top slope surfaces 420 of middle leg section 384 engage side flanges 418 on upper leg section 382 and causes tension rod 404 to move thereby compressing tension spring 417. The amount of force necessary to cause tension spring 417 to be compressed by the movement of tension rod 404 is adjusted by the amount of compression on tension spring 417 caused by tension plate 404. The movement of middle leg section 384 downwardly relative to upper leg section 382 as shown by the phantom lines in FIG. 3 is similar to the upward movement as described above. Extension leg 380 also allows for the lateral movement of the material spreader when a predetermined force is applied laterally to the material spreader or material guider as shown in FIG. 7. When a predetermined amount of lateral force is applied to material spreader 80 or material guider 110, the force causes lower leg section 386 to move is a lateral direction relative to middle leg section 384. As lower leg section 386 moves, side flanges 466 of the lower leg section engage and slide along bottom sloped sections 430 of the middle leg portion. The movement of the flanges 466 causes tension spring 468 to be compressed. The amount of force necessary to cause tension spring 468 to be compressed is adjusted by the amount of compression on tension spring 448 caused by tension plate 454. As can be appreciated, extension leg 380 can allow for simultaneous lateral movement and upward or downward movement of the material spreader.

As illustrated in FIG. 4, the material spreader and material guide can be moved between an operational position and non-operational position. The phanthom lines of FIG. 4 show the material spreader and material guider in the non-operational position. As discussed above, the position of the material spreader and material guider relative to the rear of the truck is adjusted by the use of position bracket 320 about mount shaft 312. When the material spreader and material guider is moved to the non-operational position, positioning bracket 320 is rotated about mount shaft 312 until the latch arm is positioned in plate recess 358 region or in secondary slots 363. Truck 10 is preferably provided with storage brackets 520 as shown in FIG. 15 to assist in retaining the material spreader and material guider in the stored or non-operation position. Storage brackets 520 are preferably connected to truck frame 18.

Broadcast spreading and/or precision placement spreading can be made dependent on the monitored speed of the truck. In broadcast spreading mode, such types of spreading can be initiated to cause active bouncing of the particulate material on the ground to spread the particulate material over a wide area behind the truck. The broadcast spreading can be made dependent on the speed of the truck and/or the desired width of area to be covered. This type of broadcast spreading is termed controlled broadcast spreading. In precision placement mode, the speed of the disk can also be made dependent on the speed of the truck. Preferably such control of the disk rotating speed is controlled by a control mechanism.

The control mechanism for the spreading system can include a switch panel connected to the dashboard of the truck, not shown. The switch panel is preferably a microprocessor-based control console. The switch panel allows the control mechanism to be activated and deactivated.

The switch panel can also include controls for controlling the conveyor system, guider arrangement and/or the material spreader arrangement. The switch panel can further provide a switch for selecting the quantity of particulate material to be deposited on ground surface A over a certain distance traveled by the truck (i.e. lbs/mile). The control mechanism may also include a display unit to display the speed of the conveyor belt of conveyor 40, the rotation speed of the auger 230 in the guide arrangement 170, and/or the rotational speed of the disk 82 of material spreader 80. The control mechanism can include an arithmetic function table and/or a state table in memory to enable the control system to control the speed of the conveyor belt 42, rotational speed of auger 230, and/or the rotational speed of the disk 82 (i.e. rpm/mph) relative to the speed at which the truck travels in a forward direction. These arithmetic functions and/or state table values may be preprogrammed into a memory chip of the control mechanism. The controller can be activated so that the desired quantities of particulate material are deposited on the ground surface. Once the particulate quantity is selected, the material spreader arrangement, guide arrangement, and conveyor system are activated and the controller regulates the rotational speed of the disk 82, auger blade 238, and/or the speed of the conveyor belt 42 until the control mechanism is deactivated. The control mechanism may also include a switch panel for controlling a liquid de-icer spray system, if used, and/or control the amount of de-icer deposited on the ground and/or on the particulate materials in through 180. The control mechanism may also control the amount of de-icer deposited per mile traveled by the truck (i.e. gal/mile). The control of the de-icer fluid may also be coupled with the control of the spinner speed, auger blade speed, and/or conveyor velocity. The control mechanism may include an arithmetic function and/or state tables to control the de-icer fluid flow relative to the truck speed.

The control mechanism has the capability to spread particulate material and liquid de-icer at the same time or separately, and further has the capability to regulate the amount of particulate material and liquid de-icer as a function of the distance and/or speed the truck travels. The controller also has the capacity to institute zero velocity spreading of the particulate material (precision placement spreading). The controller further has the capability to control the type of broadcast spreading. The control panel can include indicators for 1) the type of liquid de-icer and/or particulate material being spread on the ground surface, 2) the amount of particulate material and/or liquid de-icer which has been deposited on the ground, 3) the amount of particulate material and/or liquid de-icer left to be deposited, 4) showing the selected mode of operation. The control panel can also include 1) memory for recording the spreading of particulate material and/or liquid de-icer which has been deposited, 2) memory for retaining state tables and/or function equations for controlling the depositing of particulate material and/or liquid de-icer, 3) alarm indicators to indicate an error in operation and/or a problem in the spreading system, and/or 4) switches for adjusting the parameters for spreading.

When zero velocity spreading (precision placement spreading) is desired, the zero velocity switch is activated on the controller which sends a signal to the material spreader arrangement which signal is dependent on the velocity of the truck. In such operation, the control mechanism acquires the truck velocity by reading the signal from radar gun 16 which is attached to truck frame 18. As can be appreciated, the truck speed can also or alternatively be obtained from the speedometer of the truck and/or by a sensor connected to the wheel or axle of the truck. The acquired truck velocity is then used to obtain a signal value for the material spreader arrangement which is dependent on the acquired truck velocity value. The signal value is then sent to the material spreader arrangement to control the speed of the rotating disk so that the rotating disk causes the particulate material being expelled through material guider 110 to have a velocity which is substantially equal to the velocity of the forward velocity of the truck. Preferably, the signal value is sent to a valve controller, such as a pulse width modulated hydraulic valve, not shown, to control the flow of fluid through fluid lines 94 thereby controlling the speed of disk motor 92.

When the rearward velocity of the particulate material is equivalent to the forward velocity of the truck, the material exiting material guider 110 has a relative velocity to the ground of substantially zero thereby depositing the particulate material on the ground surface as if the material had been dropped in place when the truck was not moving. This zero velocity spreading allows for the particulate material to be deposited from the material spreader arrangement in a substantially narrow strip on the road as the truck is moving in a forward direction. Due to the design of the material guider, the velocity at which the material can be expelled from the material guide is dependent primarily on the rotational speed of disk 82. If constant quantity spreading is desired, the constant quantity switch is activated and the desired quantity of particulate material to be spread on ground surface A relative to the distance the truck moves is also selected. In such operation, the control mechanism acquires the truck velocity which is used to obtain a signal value for the conveyor system that is dependent on the acquired truck velocity value and the selected particulate deposition quantity. The signal value is then sent to the conveyor system to control the speed of the material mover so that the material mover causes a desired quantity of particulate material is expelled through the rear opening in the hopper and into the material spreader arrangement for spreading onto ground surface A. A signal valve for auger 230 is also acquired that is dependant on the truck velocity. The received signal valve is used by the auger to control the speed of rotation of auger blade 238 so that the desired amount of particulate material which is deposited in through 180 is moved to door opening 194. Preferably, the signal value is sent to a value controller, such as a pulse width modulated hydraulic valve, not shown, to control the flow of fluid through fluid lines to control the speed of conveyor motor 44 and auger motor 240. As can be appreciated, the signal sent to the conveyor 40 from the control mechanism is a value which produces conveyor belt speed which will cause a desired quantity of particulate material to flow through rear opening of hopper 20 and into trough 180 of guide arrangement 170. The signal sent to auger 230 from the control mechanism is a valve which products an auger blade rotational speed which will cause the desired amount of particulate material in trough 180 to move toward and pass through door opening 194 and into spreader 80 to be deposited on ground surface A. The control mechanism can constantly monitor the speed of the vehicle and upon detecting a change in the speed of the vehicle, new values can be processed and sent to the conveyor 40, auger 230, and/or spreader 80. As can be appreciated, if the truck has a dump body, the dump body is pivoted and the particulate material flows into the guide arrangement. The signal sent to auger 230 thus controls the volume of particulate material directed to material spreader 80. If zero velocity spreading and constant quantity spreading is desired, the zero velocity switch and the constant quantity switch are activated and the desired deposition quantity is selected. In such operation, the control mechanism obtains signal values for the material spreader arrangement, the guide arrangement, and/or conveyor system and simultaneously controls the material spreader arrangement, the guide arrangement, and/or conveyor system as discussed above.

The control mechanism may include a feedback control structure. Feedback control of the conveyor can be achieved by connecting a sensor in the conveyor arrangement to monitor the speed of the conveyor belt and send this information to the control mechanism. This signal from the sensor reflects the actual speed of the conveyor belt and is then compared to the desired speed of the conveyor belt. If the speed of the conveyor belt is too high, the signal being sent to the conveyor is adjusted accordingly so as to reduce the speed of the conveyor belt. However, if the conveyor speed is too low, the control mechanism will send a modified signal to the conveyor to increase the speed of the conveyor belt. This feedback control structure enables for accurate deposition rates of the particulate material during operation of the vehicle. The feedback control system for the auger and spreader can operate in a similar fashion to that of the conveyor. Feedback control of the auger can be achieved by connecting a sensor to shaft 232 to monitor the speed of rotation of auger blade 238 and to send a signal to the control mechanism. If the detected speed of auger blade 238 is too high or too low, the control mechanism sends a modified signal to auger motor 240 to adjust the rotation speed of the auger blade. This feedback control enables accurate deposition rates of the particulate material during the operation of the vehicle. A speed sensor 96 is connected to spreader motor 92 to send a signal to the control mechanism which is indicative of the actual speed of the spreader motor. If the detected speed of the motor is too low, the control mechanism sends a modified signal to increase the speed of this motor. However, if the detected speed of the motor is too high, the control mechanism sends a modified signal to the motor to reduce the speed of the motor. This feedback control system tightly controls the speed of rotation of the disk so that the velocity of the particulate material exiting material guider 110 is substantially equal to the forward velocity of the truck vehicle so that the particulate material has a relative velocity to the ground surface of substantially zero. The hydraulic control circuits for controlling the speed of the conveyor belt, auger and disk are of the type disclosed in Pat. No. 3,113,784, which is incorporated herein by reference.

The invention has been described with reference to a preferred embodiment and alternates thereof. It is believed that many modifications and alterations of the embodiment disclosed will readily suggest themselves to those skilled in the art upon reading and understanding the detailed description of the invention. It is intended to include all such modifications and alterations in so far as they come within the scope of the present invention.

Having thus described the invention, it is claimed:

1. A spreader truck having a hopper for holding materials, a material spreader and a spreader mount, said hopper including a rear opening to allow said materials to be dispensed from said hopper, said material spreader positioned rearwardly of said hopper and adapted to receive materials dispensed from said hopper and spread said received materials onto a ground surface, said spreader mount adjustably positioning said material spreader relative to said hopper and reducing the incidence of damage to said material spreader during the operation of said material spreader, said spreader mount including an arrangement selected from the group consisting of a vertical pivoting arrangement to pivot upwardly or downwardly upon encountering a predetermined amount of upward or downward force, a lateral pivoting arrangement to pivot laterally upon encountering a predetermined amount of lateral force, and combinations thereof.

2. The truck as defined in claim 1, wherein said truck includes a truck frame, said spreader mount secured to said truck frame.

3. The truck as defined in claim 2, wherein said hopper pivotally secured to said truck frame.

4. The truck as defined in claim 2, wherein said spreader mount moveable between a storage position and an operational position, said material spreader in said storage position positioned to substantially not receive materials dispensed from said hopper, spreader in a nonoperational storage position, said material spreader in said operational position positioned to receive materials dispensed from said hopper.

5. The truck as defined in claim 4, wherein said spreader mount including an alignment guide to align said material spreader in said operational position.

6. The truck as defined in claim 5, wherein said alignment guide includes a locking member to secure said spreader mount in said operational position.

7. The truck as defined in claim 1, wherein said spreader mount includes a vertical pivoting arrangement to pivot upwardly or downwardly upon encountering a predetermined amount of upward or downward force.

8. The truck as defined in claim 4, wherein said spreader mount includes a vertical pivoting arrangement to pivot upwardly or downwardly upon encountering a predetermined amount of upward or downward force.

9. The truck as defined in claim 6, wherein said spreader mount includes a vertical pivoting arrangement to pivot upwardly or downwardly upon encountering a predetermined amount of upward or downward force.

10. The truck as defined in claim 7, wherein said predetermined amount of upward or downward force is adjustable.

11. The truck as defined in claim 9, wherein said predetermined amount of upward or downward force is adjustable.

12. A truck as defined in claim 1, wherein said spreader mount includes a lateral pivoting arrangement to pivot laterally upon encountering a predetermined amount of lateral force.

13. A truck as defined in claim 8, wherein said spreader mount includes a lateral pivoting arrangement to pivot laterally upon encountering a predetermined amount of lateral force.

14. The truck as defined in claim 11, wherein said spreader mount includes a lateral pivoting arrangement to pivot laterally upon encountering a predetermined amount of lateral force.

15. The truck as defined in claim 12, wherein said predetermined amount of lateral force is adjustable.

16. The truck as defined in claim 14, wherein said predetermined amount of lateral force is adjustable.

17. A truck as defined in claim 1, wherein said spreader mount includes a plurality of vertical positions to mount said material spreader in a plurality of operational positions spaced above a ground surface.

18. The truck as defined in claim 4, wherein said spreader mount includes a plurality of vertical positions to mount said material spreader in a plurality of operational positions spaced above a ground surface.

19. The truck as defined in claim 16, wherein said spreader mount includes a plurality of vertical positions to mount said material spreader in a plurality of operational positions spaced above a ground surface.

20. The truck as defined in claim 1, wherein said spreader mount includes a spring adapted to be connected to said spreader, said spring at least partially controlling the movement of said material spreader relative to said spreader mount when said material spreader is positioned in an operating position.

21. The truck as defined in claim 19, wherein said spreader mount includes a spring adapted to be connected to said spreader, said spring at least partially controlling the movement of said material spreader relative to said spreader mount when said material spreader is positioned in an operating position.

22. The truck as defined in claim 1, wherein said material spreader includes a material guider to guide the trajectory of substantially all said materials received from said hopper onto a ground surface.

23. The truck as defined in claim 21, wherein said material spreader includes a material guider to guide the trajectory of substantially all said materials received from said hopper onto a ground surface.

24. The truck as defined in claim 22, wherein said material spreader includes a mechanism to move said material guider into and out of engagement with said materials.

25. The truck as defined in claim 23, wherein said material spreader includes a mechanism to move said material guider into and out of engagement with said materials.

26. A truck as defined in claim 22, wherein said material guider including a varying width passageway having a wide portion and a narrow portion.

27. A truck as defined in claim 1, wherein said material spreader includes a rotating member, a rotating motor and a rotational monitor, said rotating member adapted to propel said materials received in said material spreader from said material spreader, said rotating motor causing said rotating member to rotate about an axis, said rotational monitor receiving a velocity signal and causing said rotating motor to rotate said rotating member at a speed that is a function of said velocity signal, said velocity signal including a signal that is selected from a velocity which is the function of the rotational speed of the rotating member, the forward speed of said truck, and combinations thereof.

28. The truck as defined in claim 27, wherein said rotational monitor causing said rotating member to rotate at a speed to obtain a material velocity of said ejected materials which is substantially zero relative to said ground surface when said truck is moving in a forward direction.

29. The truck as defined in claim 1, including a material mover at least partially positioned in the interior of said hopper, said material mover moving particulate material in said hopper toward said rear opening.

30. The truck as defined in claim 29, wherein said material mover includes a transport arrangement selected from the group consisting of a continuous belt, a chain link and an auger.

31. A truck as defined in claim 29, wherein said material mover includes a transport arrangement, a mover motor and a movement monitor, said mover motor moving said transport arrangement, said movement monitor receiving a velocity signal and causing said mover motor to move said transport arrangement at a speed that is a function of said velocity signal, said velocity signal including a signal that is selected from a velocity which is the function of the moving speed of the transport arrangement, the forward speed of said truck, and combinations thereof.

32. The truck as defined in claim 31, wherein said movement monitor causing said mover motor to move said transport arrangement at a speed to move a sufficient amount of materials through said rear opening to enable said spreader to deposit a substantially constant amount of said material on said ground surface per distance traveled by said truck.

33. The truck as defined in claim 1, including a guide arrangement positioned rearwardly of said rear opening, said guide arrangement guiding said material passing through said rear opening to said material spreader.

34. The truck as defined in claim 4, including a guide arrangement positioned rearwardly of said rear opening, said guide arrangement guiding said material passing through said rear opening to said material spreader.

35. The truck as defined in claim 25, including a guide arrangement positioned rearwardly of said rear opening, said guide arrangement guiding said material passing through said rear opening to said material spreader.

36. The truck as defined in claim 33, wherein said guide arrangement including a conveyor selected from the group consisting of a continuous belt, a chain link and an auger.

37. The truck as defined in claim 36, wherein said guide arrangement includes an auger.

38. The truck as defined in claim 34, wherein said guide arrangement including a conveyor selected from the group consisting of a continuous belt, a chain link and an auger.

39. The truck as defined in claim 35, wherein said guide arrangement including a conveyor selected from the group consisting of a continuous belt, a chain link and an auger.

40. The truck as defined in claim 33, wherein said guide arrangement guides said material at least partially toward at least one side of said hopper.

41. The truck as defined in claim 36, wherein said guide arrangement includes a trough-like structure, said conveyor positioned in said trough-like structure, said trough-like structure including an exit opening to allow materials move within said trough-like structure by said conveyor to exit said trough-like structure.

42. The truck as defined in claim 41, wherein said guide arrangement includes a conveyor motor to control the speed said conveyor moves material in said trough-like structures toward said exit opening.

43. The truck as defined in claim 38, wherein said guide arrangement guides said material at least partially toward at least one side of said hopper.

44. The truck as defined in claim 39, wherein said guide arrangement guides said material at least partially toward at least one side of said hopper.

45. The truck as defined in claim 44, wherein said guide arrangement includes a trough like structure, said conveyor positioned in said trough-like structure, said trough-like structure including an exit opening to allow materials to move within said trough-like structure by said conveyor to exit said trough-like structure.

46. The truck as defined in claim 43, wherein said guide arrangement includes a conveyor motor to control the speed said conveyor moves materials in said trough-like structures toward said exit opening.

47. The truck as defined in claim 46, wherein said material is at least partially prewetted in said guide arrangement.

48. The truck as defined in claim 43, wherein said guide arrangement is releasably connected to the rear of said truck.

49. The truck as defined in claim 47, wherein said guide arrangement is releasably connected to the rear of said truck.

50. The truck as defined in claim 49, wherein at least one removable pin is used to releasably connect said guide arrangement to the rear of said truck.

51. A spreader truck having a hopper for holding materials, a material spreader and a spreader mount, said hopper including a rear opening to allow said materials to be dispensed from said hopper, said material spreader positioned rearwardly of said hopper and adapted to receive materials dispensed from said hopper and spread said received materials onto a ground surface, said spreader mount adjustably positioning said material spreader relative to said hopper and reducing the incidence of damage to said material spreader during the operation of said material spreader, said material spreader including a guide arrangement positioned rearwardly of said rear opening, said guide arrangement guiding said material passing through said rear opening to said material spreader, said material is at least partially prewetted in said guide arrangement.

52. A spreader truck having a hopper for holding materials, a material spreader and a spreader mount, said hopper including a rear opening to allow said materials to be dispensed from said hopper, said material spreader positioned rearwardly of said hopper and adapted to receive materials dispensed from said hopper and spread said received materials onto a ground surface, said spreader mount adjustably positioning said material spreader relative to said hopper and reducing the incidence of damage to said material spreader during the operation of said material spreader, said spreader mount movable between a storage position and an operational position, said material spreader in said storage position positioned to substantially not receive materials dispensed from said hopper, spreader in a non-operational storage position, said material spreader in said operational position positioned to receive materials dispensed from said hopper.

53. The truck as defined in claim 52, wherein said spreader mount including an alignment guide to align said material spreader in said operational position.

54. The truck as defined in claim 53, wherein said alignment guide includes a locking member to secure said spreader mount in said operational position.

55. A spreader truck having a hopper for holding materials, a material spreader and a spreader mount, said hopper including a rear opening to allow said materials to be dispensed from said hopper, said material spreader positioned rearwardly of said hopper and adapted to receive materials dispensed from said hopper and spread said received materials onto a ground surface, said spreader mount adjustably positioning said material spreader relative to said hopper and reducing the incidence of damage to said material spreader during the operation of said material spreader, said material spreader including a guide arrangement positioned rearwardly of said rear opening, said guide arrangement guiding said material passing through said rear opening to said material spreader, said guide arrangement being releasably connected to the rear of said truck.

56. The truck as defined in claim 55, wherein at least one removable pin is used to releasably connected to said guide arrangement to the rear of said truck.

57. A spreader truck having a hopper for holding materials, a material spreader and a spreader mount, said hopper including a rear opening to allow said materials to be dispensed from said hopper, said material spreader positioned rearwardly of said hopper and adapted to receive materials dispensed from said hopper and spread said received materials onto a ground surface, said spreader mount adjustably positioning said material spreader relative to said hopper and reducing the incidence of damage to said material spreader during the operation of said material spreader, said spreader mount including an arrangement to enable movement in at least one plane upon encountering a predetermined amount of force at least partially in said plane.

58. The spreader truck as defined in claim 57, wherein said at least one plane is a vertical plane, said vertical plane defining upwardly or downwardly movement of said material spreader.

59. The spreader truck as defined in claim 57, wherein said at least one plane is a lateral plane, said lateral plane defining lateral movement of said material spreader.

60. The spreader truck as defined in claim 57, wherein said spreader mount movable between a storage position and an operational position, said material spreader in said storage position positioned to substantially not receive materials dispensed from said hopper, spreader in a nonoperational storage position, said material spreader in said operational position positioned to receive materials dispensed from said hopper.

* * * * *